US 8,629,976 B2

(12) United States Patent
Hui et al.

(10) Patent No.: US 8,629,976 B2
(45) Date of Patent: *Jan. 14, 2014

(54) METHODS AND SYSTEMS FOR HIERARCHICAL DE-ALIASING TIME-OF-FLIGHT (TOF) SYSTEMS

(75) Inventors: Hua Hui, Foster City, CA (US); Cyrus Bamji, Fremont, CA (US)

(73) Assignee: Microsoft Corporation, Redmond, WA (US)

( * ) Notice: Subject to any disclaimer, the term of this patent is extended or adjusted under 35 U.S.C. 154(b) by 393 days.

This patent is subject to a terminal disclaimer.

(21) Appl. No.: 13/021,484

(22) Filed: Feb. 4, 2011

(65) Prior Publication Data

US 2011/0188028 A1 Aug. 4, 2011

Related U.S. Application Data

(63) Continuation-in-part of application No. 12/459,033, filed on Jun. 26, 2009, now abandoned, which is a continuation of application No. 11/906,609, filed on Oct. 2, 2007, now Pat. No. 7,791,715.

(60) Provisional application No. 61/400,061, filed on Jul. 21, 2010.

(51) Int. Cl.
*G01C 3/08* (2006.01)

(52) U.S. Cl.
USPC ........... 356/4.01; 356/3.01; 356/3.1; 356/4.1; 356/5.01

(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| 4,627,620 A | 12/1986 | Yang |
| 4,630,910 A | 12/1986 | Ross et al. |

(Continued)

FOREIGN PATENT DOCUMENTS

| CN | 101254344 B | 6/2010 |
| EP | 0583061 A2 | 2/1994 |

(Continued)

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

(Continued)

*Primary Examiner* — Luke Ratcliffe
(74) *Attorney, Agent, or Firm* — Vierra Magen Marcus LLP

(57) ABSTRACT

A TOF system acquires depth data using n≥3 modulation frequencies $f_1, f_2, \ldots, f_m$ separately, associated with separate aliasing interval ranges $Z_1, Z_2, \ldots, Z_m$. Next, n intermediate frequencies $f_{DE1}, f_{DE2}, \ldots, f_{DEn}$ are generated sorted by order of $f_{DE1} < f_{DE2} < \ldots < f_{DEn}$ and corresponding phases are computed from the data acquired separately using $f_1, f_2, \ldots, f_m$. Hierarchically dealiasing of the thus-acquired data is carried out using the generated intermediate frequencies. Hierarchical dealiasing may be carried out one step at a time, if desired. Thus operated, the TOF system provides an effective aliasing interval range $Z_D > Z_k$ for k=1 . . . n as if said TOF system operated at a very low modulation frequency $f_D$, while simultaneously providing depth resolution certainty as if said TOF system operated at a high modulation frequency $f_E$. Preferably high modulation frequency $f_E$ is a function of all modulation frequencies $f_1, f_2, \ldots, f_m$, which function may be an arithmetic mean or a weighted average of $f_1, f_2, \ldots, f_m$.

20 Claims, 8 Drawing Sheets

(56) References Cited

U.S. PATENT DOCUMENTS

| | | | |
|---|---|---|---|
| 4,645,458 | A | 2/1987 | Williams |
| 4,695,953 | A | 9/1987 | Blair et al. |
| 4,702,475 | A | 10/1987 | Elstein et al. |
| 4,711,543 | A | 12/1987 | Blair et al. |
| 4,751,642 | A | 6/1988 | Silva et al. |
| 4,796,997 | A | 1/1989 | Svetkoff et al. |
| 4,809,065 | A | 2/1989 | Harris et al. |
| 4,817,950 | A | 4/1989 | Goo |
| 4,843,568 | A | 6/1989 | Krueger et al. |
| 4,893,183 | A | 1/1990 | Nayar |
| 4,901,362 | A | 2/1990 | Terzian |
| 4,925,189 | A | 5/1990 | Braeunig |
| 5,101,444 | A | 3/1992 | Wilson et al. |
| 5,148,154 | A | 9/1992 | MacKay et al. |
| 5,184,295 | A | 2/1993 | Mann |
| 5,229,754 | A | 7/1993 | Aoki et al. |
| 5,229,756 | A | 7/1993 | Kosugi et al. |
| 5,239,463 | A | 8/1993 | Blair et al. |
| 5,239,464 | A | 8/1993 | Blair et al. |
| 5,288,078 | A | 2/1994 | Capper et al. |
| 5,295,491 | A | 3/1994 | Gevins |
| 5,320,538 | A | 6/1994 | Baum |
| 5,347,306 | A | 9/1994 | Nitta |
| 5,385,519 | A | 1/1995 | Hsu et al. |
| 5,405,152 | A | 4/1995 | Katanics et al. |
| 5,417,210 | A | 5/1995 | Funda et al. |
| 5,423,554 | A | 6/1995 | Davis |
| 5,454,043 | A | 9/1995 | Freeman |
| 5,469,740 | A | 11/1995 | French et al. |
| 5,495,576 | A | 2/1996 | Ritchey |
| 5,516,105 | A | 5/1996 | Eisenbrey et al. |
| 5,524,637 | A | 6/1996 | Erickson et al. |
| 5,534,917 | A | 7/1996 | MacDougall |
| 5,563,988 | A | 10/1996 | Maes et al. |
| 5,577,981 | A | 11/1996 | Jarvik |
| 5,580,249 | A | 12/1996 | Jacobsen et al. |
| 5,594,469 | A | 1/1997 | Freeman et al. |
| 5,597,309 | A | 1/1997 | Riess |
| 5,616,078 | A | 4/1997 | Oh |
| 5,617,312 | A | 4/1997 | Iura et al. |
| 5,638,300 | A | 6/1997 | Johnson |
| 5,641,288 | A | 6/1997 | Zaenglein |
| 5,682,196 | A | 10/1997 | Freeman |
| 5,682,229 | A | 10/1997 | Wangler |
| 5,690,582 | A | 11/1997 | Ulrich et al. |
| 5,703,367 | A | 12/1997 | Hashimoto et al. |
| 5,704,837 | A | 1/1998 | Iwasaki et al. |
| 5,715,834 | A | 2/1998 | Bergamasco et al. |
| 5,875,108 | A | 2/1999 | Hoffberg et al. |
| 5,877,803 | A | 3/1999 | Wee et al. |
| 5,913,727 | A | 6/1999 | Ahdoot |
| 5,933,125 | A | 8/1999 | Fernie |
| 5,980,256 | A | 11/1999 | Carmein |
| 5,989,157 | A | 11/1999 | Walton |
| 5,995,649 | A | 11/1999 | Marugame |
| 6,005,548 | A | 12/1999 | Latypov et al. |
| 6,009,210 | A | 12/1999 | Kang |
| 6,054,991 | A | 4/2000 | Crane et al. |
| 6,066,075 | A | 5/2000 | Poulton |
| 6,072,494 | A | 6/2000 | Nguyen |
| 6,073,489 | A | 6/2000 | French et al. |
| 6,077,201 | A | 6/2000 | Cheng et al. |
| 6,098,458 | A | 8/2000 | French et al. |
| 6,100,896 | A | 8/2000 | Strohecker et al. |
| 6,101,289 | A | 8/2000 | Kellner |
| 6,128,003 | A | 10/2000 | Smith et al. |
| 6,130,677 | A | 10/2000 | Kunz |
| 6,141,463 | A | 10/2000 | Covell et al. |
| 6,147,678 | A | 11/2000 | Kumar et al. |
| 6,152,856 | A | 11/2000 | Studor et al. |
| 6,159,100 | A | 12/2000 | Smith |
| 6,173,066 | B1 | 1/2001 | Peurach et al. |
| 6,181,343 | B1 | 1/2001 | Lyons |
| 6,188,777 | B1 | 2/2001 | Darrell et al. |
| 6,215,890 | B1 | 4/2001 | Matsuo et al. |
| 6,215,898 | B1 | 4/2001 | Woodfill et al. |
| 6,226,396 | B1 | 5/2001 | Marugame |
| 6,229,913 | B1 | 5/2001 | Nayar et al. |
| 6,256,033 | B1 | 7/2001 | Nguyen |
| 6,256,400 | B1 | 7/2001 | Takata et al. |
| 6,283,860 | B1 | 9/2001 | Lyons et al. |
| 6,289,112 | B1 | 9/2001 | Jain et al. |
| 6,299,308 | B1 | 10/2001 | Voronka et al. |
| 6,308,565 | B1 | 10/2001 | French et al. |
| 6,316,934 | B1 | 11/2001 | Amorai-Moriya et al. |
| 6,363,160 | B1 | 3/2002 | Bradski et al. |
| 6,384,819 | B1 | 5/2002 | Hunter |
| 6,411,744 | B1 | 6/2002 | Edwards |
| 6,430,997 | B1 | 8/2002 | French et al. |
| 6,476,834 | B1 | 11/2002 | Doval et al. |
| 6,496,598 | B1 | 12/2002 | Harman |
| 6,503,195 | B1 | 1/2003 | Keller et al. |
| 6,539,931 | B2 | 4/2003 | Trajkovic et al. |
| 6,570,555 | B1 | 5/2003 | Prevost et al. |
| 6,633,294 | B1 | 10/2003 | Rosenthal et al. |
| 6,640,202 | B1 | 10/2003 | Dietz et al. |
| 6,661,918 | B1 | 12/2003 | Gordon et al. |
| 6,681,031 | B2 | 1/2004 | Cohen et al. |
| 6,714,665 | B1 | 3/2004 | Hanna et al. |
| 6,731,799 | B1 | 5/2004 | Sun et al. |
| 6,738,066 | B1 | 5/2004 | Nguyen |
| 6,765,726 | B2 | 7/2004 | French et al. |
| 6,788,809 | B1 | 9/2004 | Grzeszczuk et al. |
| 6,801,637 | B2 | 10/2004 | Voronka et al. |
| 6,873,723 | B1 | 3/2005 | Aucsmith et al. |
| 6,876,496 | B2 | 4/2005 | French et al. |
| 6,937,742 | B2 | 8/2005 | Roberts et al. |
| 6,950,534 | B2 | 9/2005 | Cohen et al. |
| 7,003,134 | B1 | 2/2006 | Covell et al. |
| 7,036,094 | B1 | 4/2006 | Cohen et al. |
| 7,038,855 | B2 | 5/2006 | French et al. |
| 7,039,676 | B1 | 5/2006 | Day et al. |
| 7,042,440 | B2 | 5/2006 | Pryor et al. |
| 7,050,606 | B2 | 5/2006 | Paul et al. |
| 7,058,204 | B2 | 6/2006 | Hildreth et al. |
| 7,060,957 | B2 | 6/2006 | Lange et al. |
| 7,113,918 | B1 | 9/2006 | Ahmad et al. |
| 7,121,946 | B2 | 10/2006 | Paul et al. |
| 7,170,492 | B2 | 1/2007 | Bell |
| 7,184,048 | B2 | 2/2007 | Hunter |
| 7,202,898 | B1 | 4/2007 | Braun et al. |
| 7,222,078 | B2 | 5/2007 | Abelow |
| 7,227,526 | B2 | 6/2007 | Hildreth et al. |
| 7,259,747 | B2 | 8/2007 | Bell |
| 7,308,112 | B2 | 12/2007 | Fujimura et al. |
| 7,317,836 | B2 | 1/2008 | Fujimura et al. |
| 7,348,963 | B2 | 3/2008 | Bell |
| 7,359,121 | B2 | 4/2008 | French et al. |
| 7,367,887 | B2 | 5/2008 | Watabe et al. |
| 7,379,563 | B2 | 5/2008 | Shamaie |
| 7,379,566 | B2 | 5/2008 | Hildreth |
| 7,389,591 | B2 | 6/2008 | Jaiswal et al. |
| 7,412,077 | B2 | 8/2008 | Li et al. |
| 7,421,093 | B2 | 9/2008 | Hildreth et al. |
| 7,430,312 | B2 | 9/2008 | Gu |
| 7,436,496 | B2 | 10/2008 | Kawahito |
| 7,450,736 | B2 | 11/2008 | Yang et al. |
| 7,452,275 | B2 | 11/2008 | Kuraishi |
| 7,460,690 | B2 | 12/2008 | Cohen et al. |
| 7,489,812 | B2 | 2/2009 | Fox et al. |
| 7,536,032 | B2 | 5/2009 | Bell |
| 7,555,142 | B2 | 6/2009 | Hildreth et al. |
| 7,560,701 | B2 | 7/2009 | Oggier et al. |
| 7,570,805 | B2 | 8/2009 | Gu |
| 7,574,020 | B2 | 8/2009 | Shamaie |
| 7,576,727 | B2 | 8/2009 | Bell |
| 7,590,262 | B2 | 9/2009 | Fujimura et al. |
| 7,593,552 | B2 | 9/2009 | Higaki et al. |
| 7,598,942 | B2 | 10/2009 | Underkoffler et al. |
| 7,607,509 | B2 | 10/2009 | Schmiz et al. |
| 7,620,202 | B2 | 11/2009 | Fujimura et al. |
| 7,668,340 | B2 | 2/2010 | Cohen et al. |
| 7,680,298 | B2 | 3/2010 | Roberts et al. |
| 7,683,954 | B2 | 3/2010 | Ichikawa et al. |

(56) References Cited

U.S. PATENT DOCUMENTS

| | | | |
|---|---|---|---|
| 7,684,592 | B2 | 3/2010 | Paul et al. |
| 7,701,439 | B2 | 4/2010 | Hillis et al. |
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2001/0048519 | A1* | 12/2001 | Bamji et al. .................. 356/5.1 |
| 2005/0156121 | A1* | 7/2005 | Bamji et al. ............... 250/492.2 |
| 2008/0026838 | A1 | 1/2008 | Dunstan et al. |
| 2008/0100822 | A1* | 5/2008 | Munro ........................ 356/4.01 |

FOREIGN PATENT DOCUMENTS

| | | | |
|---|---|---|---|
| JP | 08044490 | A1 | 2/1996 |
| WO | 93/10708 | A1 | 6/1993 |
| WO | 97/17598 | A1 | 5/1997 |
| WO | 99/44698 | A1 | 9/1999 |

OTHER PUBLICATIONS

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", in Proceedings of the Gesture Workshop, 1998, pp. 285-296, Germany.

Kohler, "Vision Based Remote Control in Intelligent Home Environments", University of Erlangen-Nuremberg/ Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

Office Action dated 2126/2013, in Chinese Appl. No. 201110217016.4 filed Jul. 21, 2011.

International Search Report & the Written Opinion of the International Searching Authority dated Mar. 21, 2012, International Application No. PCT/US2011/044800.

Amendment dated Jun. 14, 2013, Chinese Patent Application No. 2011102170164.

\* cited by examiner

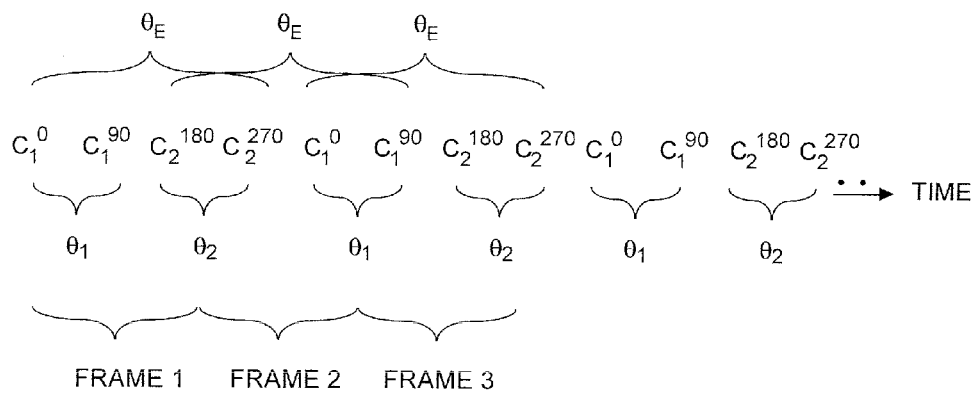
FIG. 4D
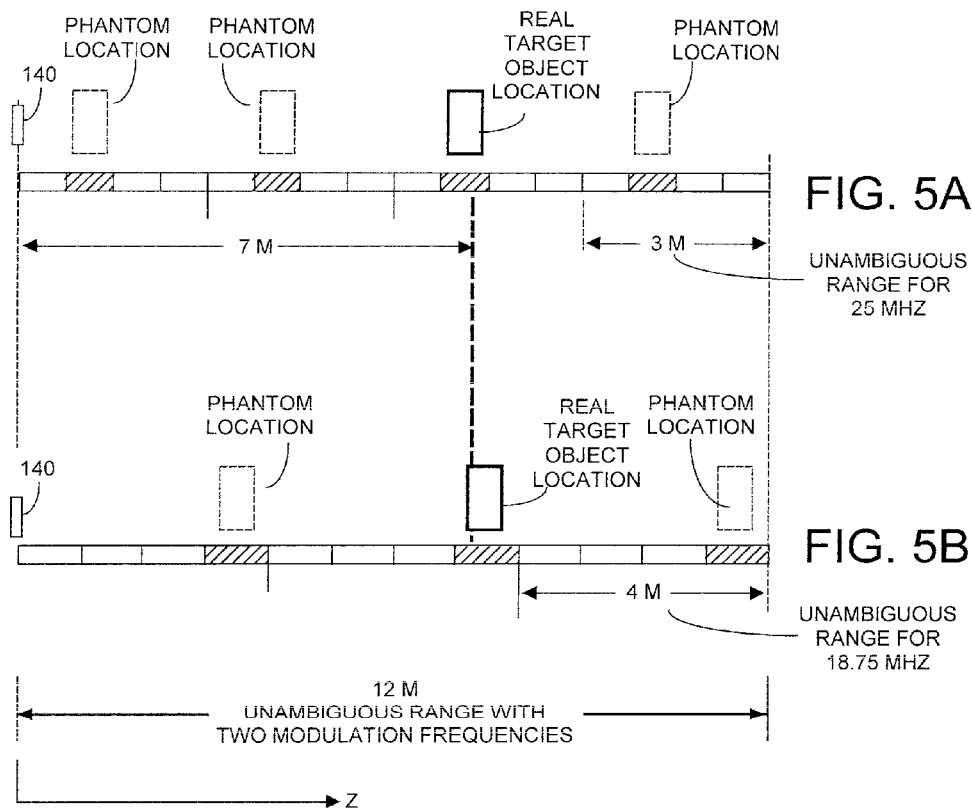
FIG. 5A
FIG. 5B

METHODS AND SYSTEMS FOR HIERARCHICAL DE-ALIASING TIME-OF-FLIGHT (TOF) SYSTEMS

RELATION TO CO-PENDING APPLICATIONS

Priority is claimed from U.S. provisional patent application Ser. No. 61/400,061 entitled Methods and Systems for Hierarchical Dealiasing Time-of-Flight (TOF) Systems, filed 21 Jul. 2010. Continuation-in-part priority is also claimed from U.S. utility application Ser. No. 12/459,033 filed 26 Jun. 2009, entitled "Method and System for Lossless Dealiasing in Time-of-Flight (TOF) Systems". Said '033 application was a continuation of U.S. patent application Ser. No. 11/906,609 filed 2 Oct. 2007 entitled "Method and System for Lossless Dealiasing in Time-of-Flight (TOF) Systems", now U.S. Pat. No. 7,791,715. This new application is a continuation-in-part of said application Ser. No. 12/459,033.

FIELD OF THE INVENTION

The invention relates generally to depth imaging systems, especially time-of-flight (TOF) imaging system that acquires depth images at distances (Z) by comparing phase shift ($\theta$) between emitted optical energy and reflected detected optical energy. Changes in Z produce change in phase shift $\theta$, but eventually phase shift begins to repeat, e.g., $\theta=\theta+2\cdot\pi$, etc. Thus, distance Z is known modulo $2\cdot\pi\cdot C/2\cdot\omega=C/2\cdot f$, where f is the modulation frequency. The present invention is directed to disambiguating (or dealiasing) the inherent ambiguity between detected values of phase shift $\theta$ and distance Z, especially in the presence of noise.

BACKGROUND OF THE INVENTION

Modern time-of-flight (TOF) systems can ascertain depth distances (Z) to a target object by emitting modulated optical energy of a known phase ($\phi$), and examining phase-shift in the optical signal reflected from the target object back to the TOF system. Exemplary such phase-type TOF systems are described in several U.S. patents received by Canesta, Inc., and now assigned to Microsoft, Inc. Such patents include U.S. Pat. Nos. 6,515,740 "Methods for CMOS-Compatible Three-Dimensional Imaging Sensing Using Quantum Efficiency Modulation", 6,906,793 entitled Methods and Devices for Charge Management for Three Dimensional Sensing, 6,678,039 "Method and System to Enhance Dynamic Range Conversion Useable With CMOS Three-Dimensional Imaging", 6,587,186 "CMOS-Compatible Three-Dimensional Image Sensing Using Reduced Peak Energy", 6,580,496 "Systems for CMOS-Compatible Three-Dimensional Image Sensing Using Quantum Efficiency Modulation".

As the present invention is used with such prior art phase-type TOF systems, it is useful at this juncture to review their operation. FIG. 1A is based upon the above-referenced patents, e.g. the '186 patent, and depicts an exemplary phase-type TOF system.

In FIG. 1A, exemplary phase-shift TOF depth imaging system 100 may be fabricated on an IC 110 that includes a two-dimensional array 130 of pixel detectors 140, which pixel detectors may be single-ended or differential in operation. Preferably each of the pixel detectors 140 has dedicated circuitry 150 for processing detection charge output by the associated detector. IC 110 preferably also includes a microprocessor or microcontroller unit 160, memory 170 (which preferably includes random access memory or RAM and read-only memory or ROM), a high speed distributable clock 180, and various computing and input/output (I/O) circuitry 190. Among other functions, controller unit 160 may perform distance to object and object velocity calculations.

Under control of microprocessor 160, optical energy source 120 is periodically energized by an exciter 115, and emits modulated optical energy toward an object target 20. Emitter 120 preferably is at least one LED or laser diode(s) emitting low power (e.g., perhaps 1 W) periodic waveform, producing optical energy emissions of known frequency (perhaps a few dozen MHz) for a time period known as the shutter time (perhaps 10 ms). Typically emitter 120 operates in the near IR, with a wavelength of perhaps 800 nm. A lens 125 is commonly used to focus the emitted optical energy.

Some of the emitted optical energy (denoted $S_{out}$) will be reflected (denoted $S_{in}$) off the surface of target object 20. This reflected optical energy $S_{in}$ will pass through an aperture field stop and lens, collectively 135, and will fall upon two-dimensional array 130 of pixel or photodetectors 140. When reflected optical energy $S_{in}$ impinges upon photodetectors 140 in array 130, photons within the photodetectors are released, and converted into tiny amounts of detection current. For ease of explanation, incoming optical energy may be modeled as $S_{in}=A\cdot\cos(\omega\cdot t+\theta)$, where A is a brightness or intensity coefficient, $\omega\cdot t$ represents the periodic modulation frequency, and $\theta$ is phase shift. As distance Z changes, phase shift $\theta$ changes, and FIGS. 1B and 1C depict a phase shift $\theta$ between emitted and detected signals. The phase shift $\theta$ data can be processed to yield desired Z depth information. Within array 130, pixel detection current can be integrated to accumulate a meaningful detection signal, used to form a depth image. In this fashion, TOF system 100 can capture and provide Z depth information at each pixel detector 140 in sensor array 130 for each frame of acquired data.

Signal detection within phase-type TOF systems such as system 100 is described more fully later herein with respect to FIG. 2B, but in brief, pixel detection information is captured at least two discrete phases, preferably 0° and 90°, and is processed to yield Z data.

System 100 yields a phase shift $\theta$ at distance Z due to time-of-flight given by:

$$\theta=2\cdot\omega\cdot Z/C=2\cdot(2\cdot\pi\cdot f)\cdot Z/C \qquad (1)$$

where C is the speed of light, 300,000 Km/sec. From equation (1) above it follows that distance Z is given by:

$$Z=\theta\cdot C/2\cdot\omega=\theta\cdot C/(2\cdot 2\cdot f\cdot\pi) \qquad (2)$$

And when $\theta=2\cdot\pi$, the aliasing interval range associated with modulation frequency f is given as:

$$Z_{AIR}=C/(2\cdot f) \qquad (3)$$

In practice, changes in Z produce change in phase shift $\theta$ but eventually the phase shift begins to repeat, e.g., $\theta=\theta+2\cdot\pi$, etc. Thus, distance Z is known modulo $2\cdot\pi\cdot C/2\cdot\omega)=C/2\cdot f$, where f is the modulation frequency. Thus there can be inherent ambiguity between detected values of phase shift $\theta$ and distance Z, and multi-frequency methods are employed to disambiguate or dealias the phase shift data. Thus, if system 100 reports a distance $Z_1$, in reality the actual distance may be any of $Z_N=Z_1+N\cdot C/2f$, where N is an integer. The nature of this ambiguity may be better understood with reference to FIGS. 1D and 1E.

FIG. 1D is a mapping of detected phase $\theta$ versus distance Z for system 100. Assume that system 100 determines a phase angle $\theta'$ for target object 20, where this phase information was acquired with a modulation frequency $f_1$ of say 50 MHz. As shown by FIG. 1D, there are several distances, e.g., $z_1$, $z_2$, $z_4$, $z_5$, etc. that could be represented by this particular phase angle . . . but which is the correct distance? In FIG. 1D, $Z_{AIR1}$ represents the Z distance aliasing interval range associated with z data acquired at frequency $f_1$, and is the distance from $z_1$ to $z_2$, or $z_2$ to $z_4$, or $z_4$ to $z_5$, etc. These various $z_1$, $z_2$, $z_4$, $z_5$, distances are ambiguous and require disambiguation or dealiasing to identify the correct distance value. The terms disambiguate and dealias, or disambiguation and dealiasing, may be used interchangeably herein.

It is desired to dealias the z data by increasing magnitude of the aliasing interval range $Z_{AIR1}$. One prior art approach does this by increasing the ratio C/2f, which is to say, by decreasing the modulation frequency f, see equation (3). FIG. 1D also shows, in bold line, phase data acquired for a lower modulation frequency $f_2$. In FIG. 1D, $f_2$ is perhaps 20 MHz, in that the slope $d\theta/dz$ for the $f_2$ waveform is less than about half the slope for the $f_1$ waveform, where the slope $d\theta/dz$ is proportional to modulation frequency $f_m$. FIG. 1E is a polar representation in which a vector, depicted as a line rotating counter-clockwise, rotates with velocity $\omega=d\theta/dt=2\pi f$. In prior art system 100, data is captured from pixel detectors at least two discrete phases, e.g., 0° and 180°.

Thus in FIG. 1D, when the lower modulation frequency $f_2$ is employed, the candidate distance values represented by phase $\theta'$ are $z_3$, $z_6$, etc. As seen in FIG. 1D, the aliasing interval range $Z_{AIR2}$ has advantageously increased from a short range $Z_{AIR1}$ (associated with faster modulation frequency $f_1$) to a greater range $Z_{AIR2}$. The ratio of the aliasing interval range increase will be the ratio $f_2/f_1$. But acquiring phase data with lower modulation frequency $f_2$ yields a Z value with less precision or resolution than if acquired with higher modulation frequency This imprecision occurs because the slope of the curve for frequency $f_2$ is about half the slope for modulation frequency $f_1$. Thus errors in the measurement of phase acquired at $f_2$ translate to greater errors in Z than errors in phase acquired at $f_1$. For the same signal/noise ratio, errors in phases acquired at f1 and at f2 will be the same, but the corresponding uncertainty errors in Z use phase acquired at the lower $f_2$ modulation frequency will be about twice as large for the representation of FIG. 1D. Thus, all things being equal, lowering the modulation frequency undesirably results in lower resolution (greater uncertainty) in accurately determining Z.

Thus while increasing the aliasing range interval is desired, doing so by decreasing the modulation frequency f is not desirable. This modulation frequency decrease approach to dealiasing is wasteful since lower modulation frequency means lower pixel sensor 140 accuracy per watt of illumination power from emitter 120 (see FIG. 1A). For example, a reduction of modulation frequency by a factor of 2.5, say from f=50 MHz to f=20 MHz, will advantageously increase the aliasing interval by the same factor, e.g., from 3 m to 7.5 m, but the penalty is a substantial (2.5)·(2.5)=6.25× increase in operating power to achieve similar uncertainty performance, assuming effects of ambient sunlight can be ignored. By way of further example, if modulation frequencies of 50 MHz and 10 MHz were used, the dealiasing range would increase from 3 m to 30 m, but at a 25× increase in operating power for the same level of uncertainty. Thus, in practice dealiasing a TOF system simply by lowering the modulation frequency is accompanied by a very substantial performance penalty.

Ideally, dealiasing a TOF system would achieve the unambiguous range for a low modulation frequency, while providing the distance resolution for a high modulation frequency. But dealiasing in the presence of noise can be challenging, especially for high modulation frequencies, or for large unambiguous ranges.

What is needed for a phase-type TOF system is a method of dealiasing or disambiguating Z data results, especially in the presence of noise. Preferably dealiasing should function well in the presence of noise, even with high modulation frequencies or for large unambiguous ranges.

The present invention provides a method and system for dealiasing in phase-type TOF systems.

SUMMARY OF THE PRESENT INVENTION

Embodiments of the present invention hierarchically dealias the depth distance Z acquired by a phase-type time of flight (TOF) system. Depth data is acquired by the TOF system using preferably at least three modulation frequencies $f_1, f_2, \ldots, f_m$ separately, wherein if said TOF system were operated solely at one of said modulation frequencies, aliasing interval ranges of $Z_1, Z_2, \ldots, Z_m$ would result. Next, n intermediate frequencies $f_{DE1}, f_{DE2}, \ldots, f_{DEn}$ are generated sorted by order of $f_{DE1} < f_{DE2} < \ldots < f_{DEn}$ and their corresponding phases are computed from the data acquired separately using three or more modulation frequencies $f_1, f_2, \ldots, f_m$. Finally there occurs hierarchically dealiasing of the data acquired for the three or more modulation frequencies, separately, using the generated intermediate frequencies. Hierarchical dealiasing may be carried out one step at a time, if desired.

The result is that the TOF system provides an effective aliasing interval range $Z_D > Z_k$ for k=1 . . . n as if said TOF system operated at a very low modulation frequency $f_D$, while simultaneously providing depth resolution certainty as if said TOF system operated at a high modulation frequency $f_E$. Preferably high modulation frequency $f_E$ is a function of all modulation frequencies $f_1, f_2, \ldots, f_m$, and the function may be, without limitation, an arithmetic mean of $f_1, f_2, \ldots, f_m$, or a weighted average of $f_1, f_2, \ldots, f_m$.

In one embodiment, the selection of the intermediate frequencies $f_{DE1}, f_{DE2}, \ldots, f_{DEn}$ can be based on a ratio between two not necessarily consecutive but shown here for simplicity frequencies $$\frac{f_{DE(k+1)}}{f_{DEk}},$$

which is limited by a ratio determined by an uncertainty requirement.

In another embodiment, hierarchical dealiasing may be carried out in a stepped sequence that includes first de-aliasing phase data of $f_{DE1}$ using phase of $f_D$, and then dealiasing phase of $f_{DE2}$ using phase of $f_{DE1}$. If desired, at each step, the phase of $f_{DE(k+1)}$ is dealiased using the phase of $f_{DEk}$ until a last step, at which phase $f_E$ is dealiased using the phase of $f_{DEn}$ to yield an unwrapped phase of $f_E$. In one embodiment, the unwrapped phase of $f_E$ is computable by using at a last step of hierarchical de-aliasing, the dealiasing phase of each modulation frequency $f_1, f_2, \ldots, f_m$ using $f_{DEn}$ to get unwrapped phase of each modulation frequency, and then computing unwrapped phase of $f_E$ using a function between $f_E$ and $f_1, f_2, \ldots, f_m$.

In one embodiment, at each step of dealiasing the phase of $f_{DE(k+1)}$ using the phase of $f_{DEk}$, a corrected phase cycle of $f_{DEk}$ within the $[0,2\pi]$ cycle of $f_{DE(k-1)}$ from a previous de-aliasing step is used to find a correct phase cycle of $f_{DE(k+1)}$ within a cycle of $f_{DEk}$. This then enables the correct cycle of $f_{DE(k+1)}$ within a total unambiguous range $Z_D$, or the cycle of $f_D$, to be found.

The present invention recognizes that the difficulty of successfully dealiasing data increases as the ratio $f_E/f_D$ increases because noise in $\theta_E$ is amplified by this ratio when $\theta_E$ used to computer $\theta_{DS}$. Consequently for high modulation frequency, which corresponds to a large effective frequency $f_E$, or for a very large unambiguous range, which corresponds to small difference frequency $f_D$, such amplified noise would produce erroneous results in estimating a dealiasing interval K. The result could cause aliasing the middle of an unambiguous range.

Embodiments of the present invention may be implemented in hardware and/or software, which hardware and/or software may be part of the TOF system with which the invention is practiced. Hierarchical dealiasing according to the embodiments of the present invention is preferably relatively low loss.

Other features and advantages of the invention will appear from the following description in which the preferred embodiments have been set forth in detail, in conjunction with their accompanying drawings.

BRIEF DESCRIPTION OF THE DRAWINGS

FIG. 4D depicts a sequence for which direct computation of $\theta_E$ is made, as well as depicting resultant phase shift and frame construction, according to an embodiment of the Ser. No. 12/459,033 application;

FIGS. 5A and 5B depict target object locations, real and phantom, determined using two modulation frequencies, according to a least common multiple dealiasing embodiment of Ser. No. 12/459,033 application.

DESCRIPTION OF THE PRESENT INVENTION

Embodiments of the present invention implement methods and systems to hierarchically dealias time-of-flight (TOF) phase using at least three frequencies, and will be described with reference to FIGS. 6-7D. Conventional de-aliasing relies upon use of two frequencies. However using three or more frequencies can advantageously substantially increase the unambiguous distance of the TOF system, without significantly amplifying noise. Aspects of the present invention can address hierarchical dealiasing, including aspects of probability distribution of phase, and elliptical correction.

However a greater appreciation and understanding of hierarchical three-frequency dealiasing is obtained by first reviewing two-frequency dealiasing according to the Ser. No. 12/459,033 application. Dealiasing according to the Ser. No. 12/459,033 application is lossless, and could advantageously provides a relatively large aliasing interval range commensurate with a low modulation frequency. This was achieved while also providing high precision certainty with respect to a given Z value, commensurate with a modulation frequency close to the highest modulation frequency $f_m$. A description of the Ser. No. 12/459,033 application will first be made with reference to FIGS. 2A-5B.

Figure 1A:
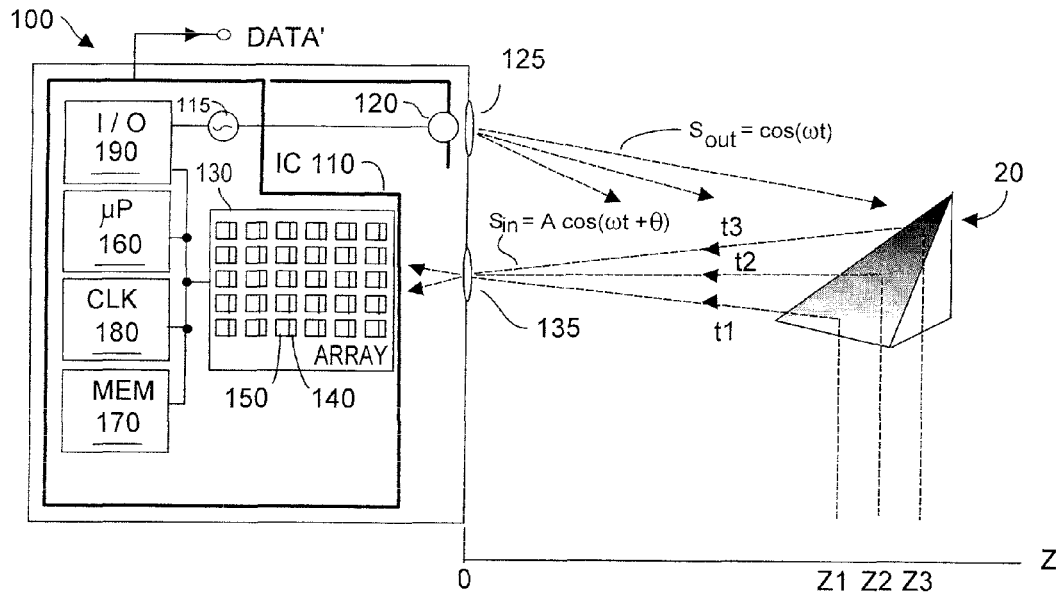
FIG. 1A is a block diagram depicting a phase-type time-of-flight three-dimensional imaging system, according to the prior art.
Figure 1B:
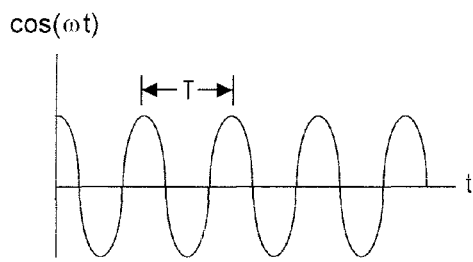
FIGS. 1B and 1C depict emitted and reflected optical energy waveforms associated with the imaging system of FIG. 1A, according to the prior art.
Figure 1C:
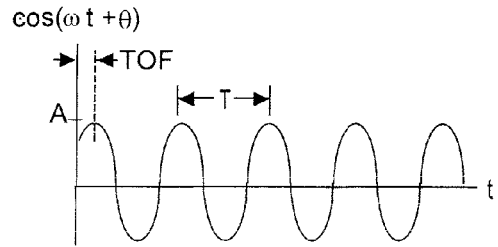
Figure 2A:
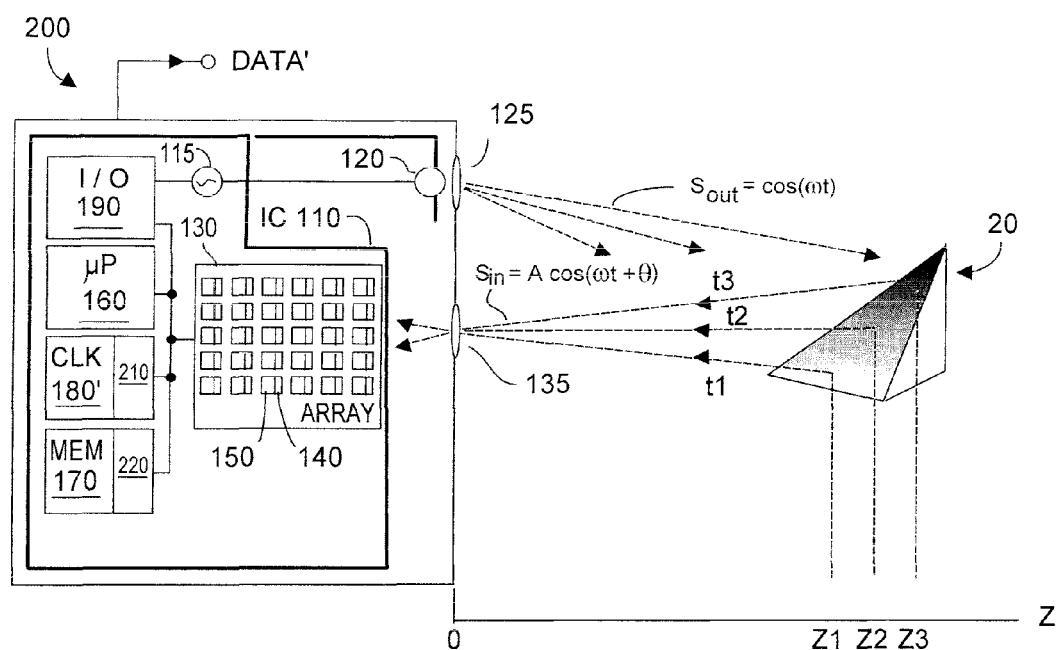
FIG. 2A depicts a phase-type time-of-flight three-dimensional imaging system with dealiasing, according to embodiments of the Ser. No. 12/459,033 application.

FIG. 2A depicts a phase-type TOF system 200 similar to that described with respect to FIGS. 1A-1C, except that additional components 210 and software 220 are included to implement embodiments of the Ser. No. 12/459,033 application. As such, software 220 and 210 may be considered as a dealiasing subsystem for TOF system 200. Output DATA' may include information provided as DATA by TOF system 100 in FIG. 1A. A TOF system such as system 100 (FIG. 1A) or 200 (FIG. 2A) normally is operable at some maximum modulation frequency $f_m$, perhaps 100 MHz. This is not to say that the system cannot be operated at a modulation frequency greater than $f_m$, but it is realized that at such higher modulation frequencies, system performance ultimately degrades. Thus, it is understood that $f_m$ denotes the highest modulation frequency at which the system is normally operable, and not the highest modulation frequency at which it can be operated.

Figure 2B:
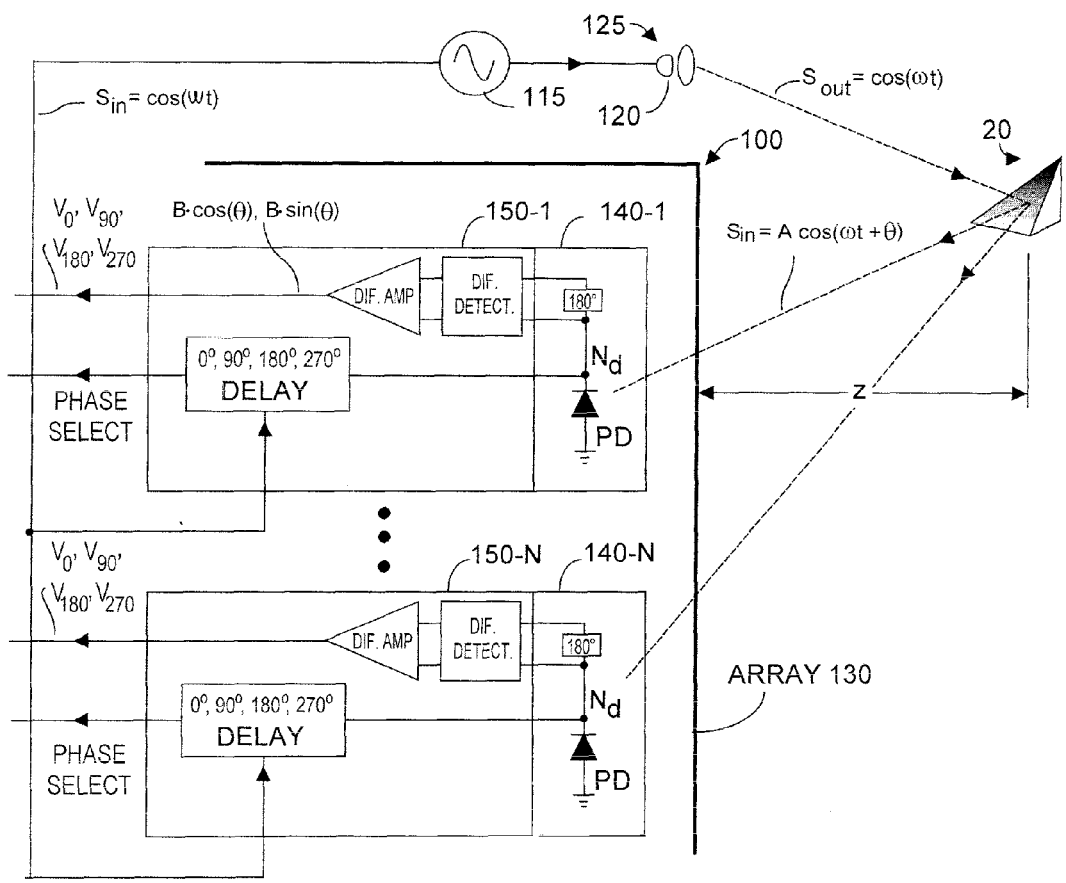
FIG. 2B depicts details of exemplary phase capture at 0° and 180°, 90° and 270°, according to embodiments of the present invention.

Before describing dealiasing operation of system 200, it is useful to briefly describe multiphase detection with reference to FIG. 2B, which shows two of the many photodetectors (PD) in array 130, namely photodetectors 140-1, and 140-N, as well as some of their associated electronics, namely 150-1, 150-N. This particular embodiment employs quantum efficiency (QE) modulated differential photodetectors or pixels 140, whose pixel detection information is captured at least two discrete phases 0° and 90°, and more preferably four discrete phases 0° and 180°, and 90° and 270°. These discrete phase operations of the pixel detectors are not to be confused with the phase shift data θ that is sought to be detected. These discrete phases represent shift between modulator 115 and optical energy emitter 120, whereas the phase shift data θ that is sought to be detected is shift between emitted optical energy $S_{out}$ from emitter 120, and pixel detectors 140 in array 130 (see FIG. 2A).

The detection phase data that is captured at the discrete phases is denoted herein as captures $C^0$ and $C^{180}$, $C^{90}$ and $C^{270}$ and is processed to implement dealiasing according to the Ser. No. 12/459,033 application. Acquisition using four phases is preferred so as to remove so-called fixed pattern offset. The $C^0$ acquisition yields data but may include an error offset from zero, e.g., the value $C^0$ may not be zero when there is no signal to be detected. By the same token, the $C^{180}$ acquisition should have the same, but inverted, data and will have the same fixed pattern offset. Advantageously by subtracting ($C^0-C^{180}$) and preferably also subtracting ($C^{90}-C^{270}$), phase and Z data information is preserved but the fixed pattern offset is canceled out. However embodiments of the Ser. No. 12/459,033 application may be used to dealias multiphase TOF data that is obtained from single-ended phase detectors, as well as from detection systems that do not employ QE modulation detection.

Phase angle $\theta$ can be computed from captures $C^0$, $C^{90}$, $C^{180}$, $C^{270}$, as follows:

$$\theta = a\tan 2(C^{90}-C^{270}, C^0-C^{180}) \quad (4)$$

where a tan 2(X,Y) is the trigonometric function corresponding to a tan(Y/X)

The configuration and operation of what is shown in FIG. 2B is similar to what was described with respect to a fixed phase delay embodiment (FIG. 10) in earlier-referenced U.S. Pat. Nos. 6,580,496 and 7,906,793. In FIG. 2B, detection-generated photocurrent from each QE-modulated differential pixel detector, e.g., 140-1, is differentially detected (DIF. DETECT) and differentially amplified (AMP) to yield signals $B\cdot\cos(\theta)$, $B\cdot\sin(\theta)$, where B is a brightness coefficient, A fixed discrete 0° or 90° phase shift delay (DELAY), and more preferably a fixed 0° or 180 or 90° or 270° phase shift is switchably insertable responsive to a phase select control signal (PHASE SELECT) that can be commanded by clock unit 180'. Phase data, e.g., $C^0$ and $C^{180}$, $C^{90}$ and $C^{270}$, is acquired or captured from the pixel detectors at these discrete phases. A more detailed description of such phase detection may be found in the above-referenced patents, but without limitation, the fixed discrete phase shifts may be inserted by clock unit 180', whose signal is used to drive detector array 130, or may be introduced by modulator 115; see FIG. 2B.

According to the Ser. No. 12/459,033 application, preferably close together modulation frequencies $f_1$ and $f_2$, each typically less than the system maximum modulation frequency ($f_m$) are combined. The resultant phase data acquired from each, denoted $\theta_1$ and $\theta_2$, is used to provide two goals: (1) obtaining the equivalent of a high modulation frequency measurement from system 200 that yields a low level of Z resolution uncertainty, and (2) obtaining the equivalent of a low modulation frequency measurement from system 200 that provides a long aliasing interval Z range. In this fashion the approximate Z range is determined from the long aliasing interval, while more precise determination of the Z value is determined from the high modulation frequency measurement.

Referring back to FIG. 2A, software 220 when executed by processor 160 can alter normal operation of clock circuit 180' by virtue of components 210. System 200 is thus caused to operate using at least first and second frequencies $f_1$, $f_2$, where $f_1 > f_2$, $f_1$ is close to $f_m$, preferably within about 40% or less of $f_m$, and f2 is within about 35% of $f_1$ and preferably closer. Thus $f_1$ may be said to lie in a range of about 60% to 100% of the frequency of $f_m$ such that if $f_m$ were say 100 MHz, then $f_1$ would have a frequency of about 60 MHz to as high as 100 MHz. Similarly the range of $f_2$ is about 65% to about 99% the frequency such that if $f_1$ was say 90 MHz, then $f_2$ would have a frequency of about 58.5 MHz to about 89.1 MHz.

According to the Ser. No. 12/459,033 application, using modulation frequencies $f_1$ and $f_2$ cause system 200 to behave with respect to dealiasing interval as though phase data were collected while system 200 was being operated at a very slow modulation frequency $f_D$ that preferably is proportional to ($f_1-f_2$). For example, assume that operation of system 200 at modulation frequency $f_1$ provides an aliasing interval range $Z_{AIR1}$ and that operation of system 200 at modulation frequency $f_2$ provides an aliasing interval range $Z_{AIR2}$. Embodiments of the Ser. No. 12/459,033 application process data acquired at modulation frequency $f_1$ and at modulation frequency $f_2$ to provide an effective aliasing interval range $Z_{AIRD} > Z_{AIR2}$, $Z_{AIR1}$.

Further, such use of preferably close together modulation frequencies $f_1$ and $f_2$ advantageously produced good resolution precision of Z measurements as though system 200 were collecting phase data operating with a high effective modulation frequency close to $f_m$, perhaps ($f_1+f_2$)/2 or other combination of $f_1$ and $f_2$. It is noted that the frequencies ($f_1-f_2$), ($f_1+f_2$)/2 and other combinations of these modulation frequencies are really mathematical constructs or virtual frequencies, and system 200 does not physically operate at those virtual frequencies. Of course it is understood that more than two modulation frequencies $f_1$, $f_2$ may be used, which different modulation frequencies preferably are close in frequency to each other and to $f_m$. Using multiple modulation frequencies also results in Z resolution certainty or precision better than would be achieved if the TOF system processed data acquired solely while operating at modulation frequency $f_1$ and disregarded data acquired at modulation frequency $f_2$, or operated at modulation frequency $f_2$ and disregarded data acquired at modulation frequency $f_1$.

Figure 3:
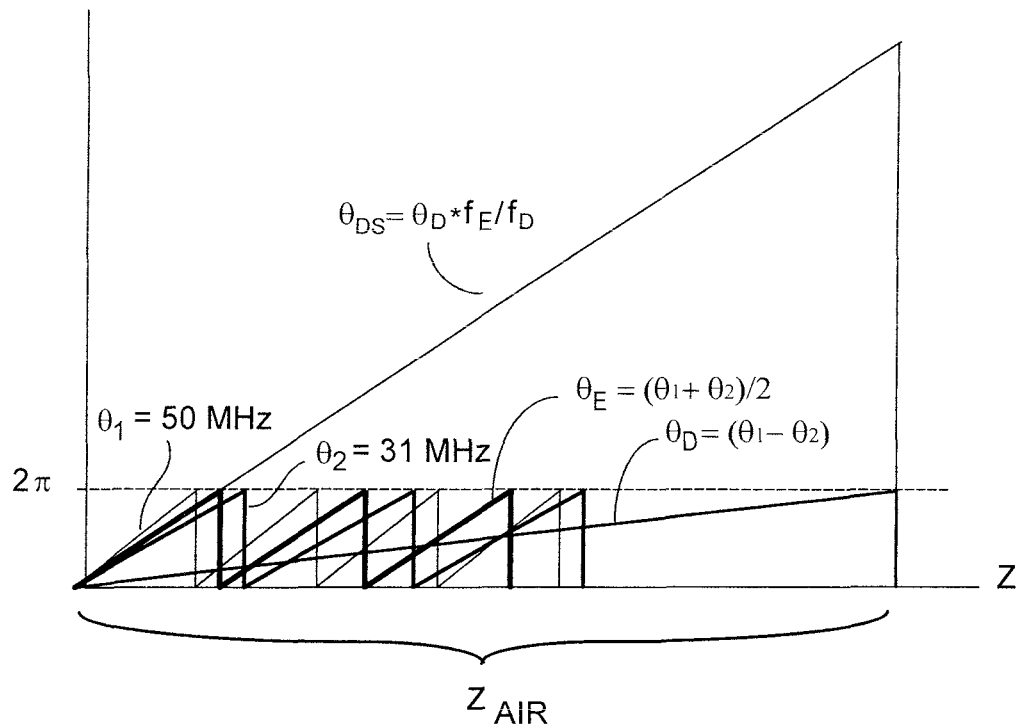
FIG. 3 acquired phase-vs-distance Z for two close modulation frequencies, and for virtual frequencies $f_D$, $f_E$, and $f_{DS}$, and resultant large aliasing interval $Z_{AIR}$, according to embodiments of the Ser. No. 12/459,033 application.

As will be appreciated from what is shown in FIG. 3, in contrast to prior art dealiasing wherein $f_m$ is decreased with loss of system efficiency, embodiments of the Ser. No. 12/459,033 application operated system 200 at high frequency, preferably close to $f_m$, which maintains high operating system efficiency. Further, because modulation frequencies $f_1$ and $f_2$ preferably are close to each other and to $f_m$, phase information captured by pixel detectors 140 at one modulation frequency may be shared with data frames captured at the other modulation frequency (or frequencies, if more than two modulation frequencies are employed).

Figure 1D:
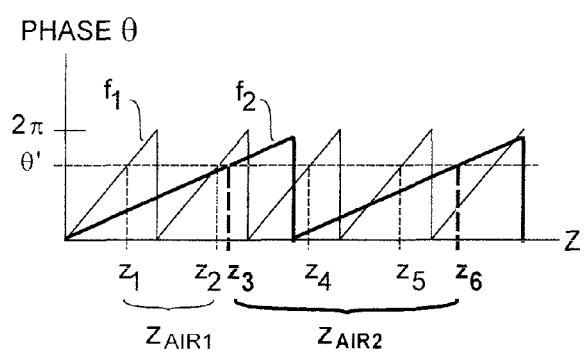
FIG. 1D depicts acquired phase-vs-distance Z for two modulation frequencies and demonstrates aliasing intervals, and distance ambiguity, according to the prior art.

FIG. 3 is a plot of phase versus distance Z, according to the Ser. No. 12/459,033 application. A waveform is shown for phase data acquired using first modulation frequency $f_1$, which data is denoted $\theta_1$. For purposes of explanation, assume $f_1$ is about 50 MHz. FIG. 3 also shows a plot of phase data acquired using a slightly lower second modulation frequency $f_2$, data for which is denoted $\theta_2$. For purposes of explanation, assume $f_2$ is about 31 MHz, and according its slope is less than that of the $f_1$ waveform, and its period (or aliasing interval range) is longer. For these exemplary values of $f_1$ and $f_2$, a typical value of $f_m$ for system 200 might be 70 MHz. The $f_2$ waveform is drawn with a heavier line than the $f_1$ waveform to promote clarity in the figure. As was the case with the plot described in FIG. 1D, at phase multiples of $2\pi$ the data folds-over or wraps around. The wrap-around somewhat complicates the calculations of $\theta_E$ and $\theta_{DS}$ as noted later herein.

As noted, one aspect or goal of the Ser. No. 12/459,033 application was to provide a large aliasing interval range $Z_{AIR}$ by making it appear as though system 200 acquire phased phase data using a relatively low modulation frequency. The following description will demonstrate that defining a difference frequency $f_D$ that preferably is a function of $f_1$ and $f_2$ and defining a phase difference $\theta_D = (\theta_1-\theta_2)$ will achieve the goal of providing a low modulation frequency suitable for a large aliasing interval range. Without limitation, an exemplary function for $f_D$ may be a difference function $(a \cdot f_1 - b \cdot f_2)$, where a and b may be weighting factors.

Mathematically, phase delay θ may be expressed in terms of absolute target distance Z as:

$$\theta = 2\pi \left( \frac{2fZ}{C} + N \right) \quad (5)$$

Differentiating equation (5) yields:

$$\delta\theta = \frac{4\pi Z \delta f}{C} \quad (6)$$

Therefore the absolute (dealiased) distance $Z_{ABS}$ is given by:

$$Z_{ABS} = Z = \frac{C}{4\pi} \frac{\delta\theta}{\delta f} \quad (7)$$

In this instance, the differential in equation (7) can be replaced with small differences without loss of precision, to yield:

$$Z = \frac{C}{4\pi} \frac{\Delta\theta}{\Delta f} \quad (8)$$

Equation (8) shows that Z can be determined from $\Delta\theta$, which is $\theta_D$ or (or $\theta_1 - \theta_2$) and from $\Delta f$. Note that this is the same equation one would use to determine Z from a modulation frequency $\Delta f = f_D = f_1 - f_2$ and phase $\Delta\theta = \theta_D = \theta_1 - \theta_2$. Thus with knowledge of $f_1$, $f_2$, $\theta_1$, $\theta_2$, one can compute a measurement for distance Z that is akin to a calculation for Z where the actual modulation frequency was physically $(f_1 - f_2)$. This represents the combination of modulation frequencies $f_1$ and $f_2$ that will yield a large aliasing interval range, as though system 200 were acquiring phase data while operating at a very low modulation frequency. Of course many other combinations of $f_1$ and $f_2$ could be used to achieve this goal, and one could employ more than two modulation frequencies, e.g., $f_1$, $f_2$, $f_3$, . . . . Preferably the highest of these modulation frequencies $f_1$ would be close to the system highest maximum modulation frequency $f_m$ and at least within 40% of $f_m$. Preferably at least the closest together of the various modulation frequencies would be within about ±35% of each other, and preferably closer together than that.

Preferably maximum modulation frequency $f_m$ is close to the optimal operating point for TOF system 200. This means that $f_m$ is near a maximum of operating efficiency, and therefore curve of system operating efficiency is relatively flat in the vicinity of $f_m$. Generally this maximum is quite flat and therefore operating frequencies $f_1$ and $f_2$ will also be close to the optimal operating conditions for system 200.

Design consideration in implementing a high effective (e.g., virtual) modulation frequency commensurate with a desired low level of Z resolution uncertainty will now be presented, according to the Ser. No. 12/459,033 application. Phase data obtained from system 200 (see FIG. 2A) operating at modulation frequencies $f_1$ and $f_2$ are combined to yield an effective (virtual) frequency measurement at frequency $f_E$. Rather than use data obtained from system 200 operating at modulation frequency $f_1$ alone, or at modulation frequency $f_2$ alone, embodiments of the Ser. No. 12/459,033 application advantageously combines data acquired at both modulation frequencies to further lower uncertainty in the Z data. (It is understood that if additional modulation frequencies are used, e.g., $f_3$, $f_4$, . . . phase data acquired while system 200 was operating at these modulation frequencies would also preferably be used).

Combining phase data from all modulation frequencies used (e.g., $f_1$ and $f_2$ in the example at hand) averages noise in the phase data measurements, and advantageously results in lower noise than would be obtained using data acquired solely from $f_1$ or $f_2$ alone. Furthermore, because modulation frequencies $f_1$ and $f_2$ are preferably relatively close to maximum modulation frequency $f_m$, each measurement is obtained with relatively high precision and lowered noise. In general for close together frequencies $f_1$ and $f_2$, system 200 performance will be somewhat similar. Advantageously, uncertainty obtained after combining data from frequency $f_1$ and $f_2$ will be about 0.7 times the uncertainty when phase data acquired using modulation frequency $f_1$ or modulation frequency $f_2$ was used alone.

Thus this second aspect of the Ser. No. 12/459,033 application relates to combining phase data acquired by system 200 operating at different (but preferably close to each other) modulation frequencies so as to emulate system operation at a high modulation frequency that yields a low Z resolution uncertainty. While some specific methods of combining data will now be described, it is understood that many other combinations could also be used.

With respect to this second aspect or goal, one approach is to combine that raw data readings from pixel detectors 140 in array 130 (see FIGS. 2A and 2B) from captures ($C_0^1$, $C_1^{90}$, $C_1^{180}$, $C_1^{270}$) obtained at modulation frequency $f_1$ and add this raw data to data readings ($C_2^0$, $C_2^0$, $C_2^{180}$, $C_2^{180}$) obtained at a frequency $f_2$ to produce ($C_1^0 + C_2^0$, $C_1^0 + C_2^0$, $C_1^{180} + C_2^{180}$, $C_1^{270} + C_2^{180}$). This exemplary combination is equivalent to adding the respective phase vectors together in a polar representation and obtaining the phase angle for the sum vector.

Figure 1E:
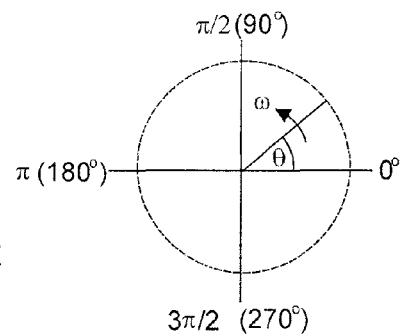
FIG. 1E is a polar representation of acquired phase data as a function of modulation frequency, according to the prior art.

Consider now a polar representation of the phase vector for a target object 20 at a given distance Z, acquired by system 200 operating at modulation frequency $f_1$ or at modulation frequency $f_2$. (FIG. 1E may be regarded as a polar representation for a single phase vector.) The phase vectors may be represented in polar form as $V_1 = (\rho, \theta_1)$ and $V_2 = (\rho, \theta_2)$ for captures at modulation frequencies $f_1$, $f_2$ respectively. For ease of explanation it will be assumed that the small change in modulation frequency does not affect modulation contrast, and hence both $V_1$ and $V_2$ have the same magnitude ρ. (The term "modulation contrast" denotes a measure of collection efficiency within pixel detectors 140, e.g., how well incoming photon energy from signal $S_{in}$ is captured and converted into a detection signal. A high modulation contrast is desirable.)

Adding phase vectors $V_1 = (\rho, \theta_1)$ and $V_2 = (\rho, \theta_2)$ yields:

$$V_1 + V_2 = (2\rho \cdot \sin((\theta_1 - \theta_2)/2), (\theta_1 + \theta_2)/2) \quad (9)$$

Thus if $(\theta_1 - \theta_2)$ is not a multiple of π, the phase of $V_1 + V_2$ that would make the vector null will be the same phase $(\theta_1 + \theta_2)/2$ as the phase vector for target object 20 measured at modulation frequency $(f_1 + f_2)/2$. In practice, however, modulation contrast varies with frequency, which complicates implementation of this addition method. A further complication is variation in modulation contrast ratio with temperature, which makes the mathematics somewhat unwieldy.

In an alternate embodiment, actual phase angles from the two measurements $\theta_1$ and $\theta_2$ at modulation frequencies $f_1$ and $f_2$ are themselves combined to produce an effective phase angle $\theta_E$. Typically the average $(\theta_1+\theta_2)/2$ of the phase angles is used, although other combinations of the actual phase angles are possible.

As noted above, values for $\theta_E$ and $\theta_D$ may be determined in a variety of way. Regardless of the specific method used to obtain these values, preferably $\theta_E$ and $\theta_D$ are both used to determine distance Z, as shown by FIG. 3. FIG. 3 depicts phase angles $\theta_1$, $\theta_2$, $\theta_D=\theta_1-\theta_2$ and $\theta_E=(\theta_1+\theta_2)/2$ associated, respectively, with frequencies $f_1$, $f_2$, $f_D=(f_1-f_2)$, and $f_E=(f_1+f_2)/2$. It is noted that $\theta_1$ and $\theta_2$ are normalized so as to be 0 for Z=0. FIG. 3 also depicts $\theta_{DS}$, which may be derived from $\theta_D$ as $\theta_{DS}=\theta_D \cdot f_E/f_D$. Angle $\theta_{DS}$ corresponds to the same frequency as $\theta_E$ and thus has the same slope as $\theta_E$ as shown in FIG. 3. However because angle $\theta_{DS}$ is mathematically derived from $\theta_D$, it advantageously has the same large aliasing interval as $\theta_D$, denoted $Z_{AIR}$.

Note that both $\theta_D$ and $\theta_E$ are adjusted to take account the foldover or wrap around repetitions of $\theta_1$ and $\theta_2$. For example, before the end of the first aliasing interval of $\theta_E$, $\theta_1$ wraps around. Simply computing $\theta_E=(\theta_1+\theta_2)/2$ would not suffice because $\theta_E$ would decrease by $\pi$ when $\theta_1$ wraps around. However when $\theta_1<\theta_2$, it is known that $\theta_1$ must have wrapped around, and hence it must be added to $\theta_E$. Such trigonometric corrections are well known in the art and are assumed to have been performed on the data.

Having thus appropriately trigonometrically corrected $\theta_E$ and $\theta_D$, since $\theta_{DS}$ and $\theta_E$ have the same slope and differ only by their aliasing interval, in the absence of noise it follows that $\theta_{DS}=\theta_E+K2\pi$. K is an integer that represents the index of the aliasing interval of $\theta_E$. In the presence of noise, $\theta_{DS}\cong\theta_E+K2\pi$. Finding the correct aliasing interval involves selecting K so as to minimize the absolute value of $(\theta_{DS}-\theta_E+K2\pi)$. $\theta_E+K2\pi$ then represents an accurate measure of Z, but with unknown aliasing interval. The expression $\theta_E+K2\pi$ represents the dealiased value of $\theta_E$. It is of course assumed that the target object is at a distance less than the aliasing interval for $f_D$. It is understood that other equivalent mathematical approaches to determine suitable values for K may also be employed.

It is important to select an appropriate difference frequency $f_D$. If $f_D$ is too big, the corresponding dealiasing interval for $f_D$ may be too small. Conversely, if $f_D$ is too small, then resolution certainty in Z measurements at $f_D$ can become too large. Thus, difference frequency $f_D$ should be as small as possible, subject to the noise constraints affecting resolution uncertainty. The aliasing interval index K should be determined with high certainty to ensure the proper dealiasing interval is selected.

If it assumed that $f_D<<f_E$, then error$(\theta_{DS})>>$error$(\theta_E)$ and one can generally neglect error from $\theta_E$. Let $K_s=((\theta_{DS}-\theta_E)/2\pi)$. Then K is the closest integer to $K_s$. To find the correct K, the error on $K_s$ must be $<<0.5$, which means the error on $\theta_{DS}/2\pi=\theta_D \cdot f_E/f_D/2\pi$ must also be substantially less than 0.5.

The following section will now describe exemplary approaches to identifying good capture sequences for modulation frequencies $f_1$ and $f_2$, according to the Ser. No. 12/459,033 application. Many different capture sequences may be used to generate dealiased frames. A frame represents a complete Z image acquired by sensor array 130, which is to say that each pixel detector 140 in the array is associated with a corresponding Z value from target object 20. Assume first that pixel detectors 140 in system 200 can only achieve one capture at a time. Under this assumption, some exemplary sequences are as follows.

Figure 4A:
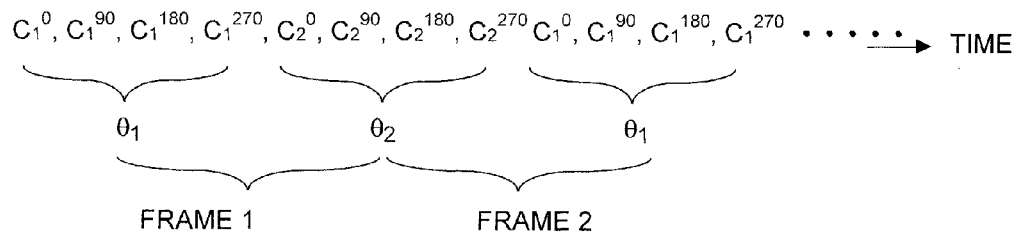
FIG. 4A depicts a sequence of eight different captures from one pixel detector, as well as resultant phase shift and frame construction, according to an embodiment of the Ser. No. 12/459,033 application.

A first case is depicted in FIG. 4A, where it is assumed that the same pixel detector is sequenced though eight different captures to acquire the desired phase shift data $\theta_1$, $\theta_2$. Thus as shown in FIG. 4A, with system 200 operating at modulation frequency $f_1$ a sequence of captures $C_1^0, C_1^{90}, C_1^{180}, C_1^{270}$ is acquired over time. Next, with system 200 operating at modulation frequency $f_2$, a sequence of captures $C_2^0, C_2^{90}, C_2^{180}, C_2^{270}$ is acquired, after which the system is returned to operating at modulation frequency $f_1$ and a sequence of captures $C_1^0, C_1^{90}, C_1^{180}, C_1^{270}$ is made, and so on. Thus in FIG. 4A (as well as in FIGS. 4B-4D), the phase information displayed beneath the relevant sequence of captures is the phase data acquired by system 200 operating at the associated modulation frequency. Thus it is understood that subscript 1 denotes captures associated with modulation frequency $f_1$ and subscript 2 denotes captures associated with modulation frequency $f_2$. The frame information displayed beneath the phase information shows how frames are preferably constructed, according to the sequence shown. Once $\theta_1$ and $\theta_2$ have been determined, $\theta_E$ can be calculated from $(\theta_1+\theta_2)/2$.

Figure 4B:
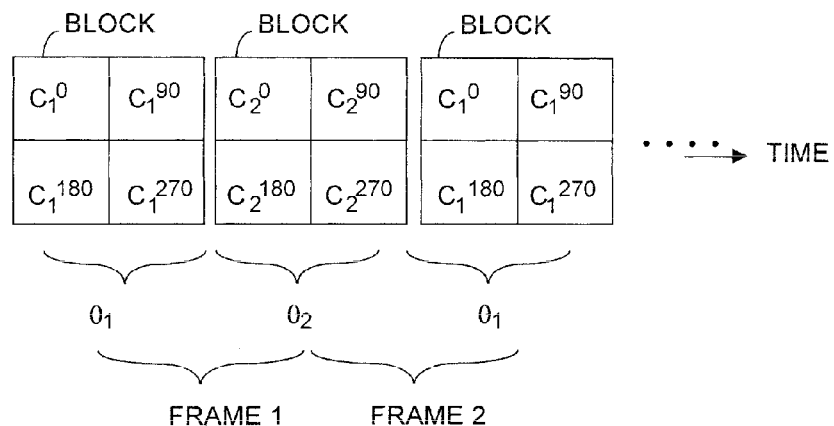
FIG. 4B depicts a sequence in which four adjacent pixel detectors acquire four phases in a single capture, as well as resultant phase shift and frame construction, according to an embodiment of the Ser. No. 12/459,033 application.

FIG. 4B depicts another sequencing example, in which four adjacent pixel detectors, shown as a block, in the pixel array are used to acquire all four phases in a single capture. Whereas the eight capture sequence of FIG. 4A is susceptible to motion blur due to the length of time to acquire all eight captures, the sequence shown in FIG. 4B should inherently exhibit lower motion blur. But in FIG. 4B, the $C^0-C^{180}$ offset cancellation is done with data from different pixels and performance can suffer in that offsets are not fully cancelled. As before, $\theta_E$ is calculated from $(\theta_1+\theta_2)/2$.

Figure 4C:
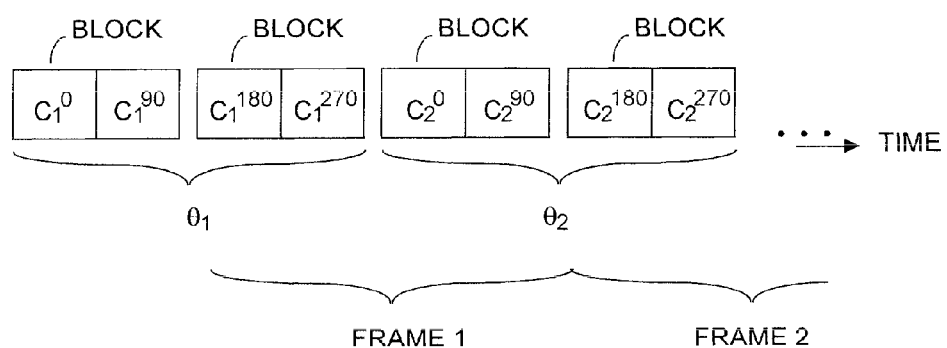
FIG. 4C depicts a sequence in which captures for each phase are offset-cancelled using data from the same pixel detector, as well as resultant phase shift and frame construction, according to an embodiment of the Ser. No. 12/459,033 application.

FIG. 4C depicts yet another sequencing example, one in which captures for each phase are cancelled with respect to $C^0-C^{180}$ offset with the same pixel detector, shown as a block. In this configuration, performance is quite good, and motion blur is acceptable. As before, $\theta_E$ is calculated from $(\theta_1+\theta_2)/2$.

FIG. 4D depicts an alternative embodiment in which phase $\theta_1$ and phase $\theta_2$ are not $C^0-C^{180}$ offset corrected. As a result, data quality is somewhat poor, but advantageously $\theta_E$ is computed directly from the captures $C_1^0-C_2^{180}$ and $C_1^{90}-C_2^{270}$. The method is as described previously, where $C_2^{180}$ is substituted for $C\theta_2^0$ and where $C_2^{270}$ is substituted for $C_2^{90}$. Advantageously, data quality for $\theta_E$ is good but $\theta_D=\theta_1-\theta_2$ is of poor quality and as a result the dealiasing interval decision quality suffers.

An alternative embodiment, not depicted explicitly, is similar to that of FIG. 4D, but wherein $\theta_E$ is calculated from $(\theta_1-\theta_2)/2$. As noted earlier, acquired phase angles preferably are normalized to start at zero for Z=0. In the alternative embodiment at hand, if pre-normalization differences between $\theta_1$ and $\theta_2$ are small, then offset induced errors in $\theta_1$ and $\theta_2$ will be opposite of each other and will advantageously partially cancel out in $\theta_E=(\theta_1-\theta_2)/2$. If O is the assumed small offset, then from equation (4), $\theta_1=$a tan $2(C_1^0+O, C_1^{90}+O)$, and $\theta_2=$a tan $2(-C_2^{180}+O, -C_2^{270}+O)$. If modulation contrast is similar for both modulation frequencies $f_1$ and $f_2$, and $\theta_1\approx\theta_2$, then $C_1^0\approx C_2^{180}$ and $C_1^{90}\approx C_2^{270}$. Thus, $\theta_1\approx$a tan $2(C_1^0+O, C_1^{90}+O)$ and $\theta_2\approx$a tan $2(C_1^0-O, C_1^{90}-O)+\pi$. As such, phases $\theta_1$ and $\theta_2$ move in opposite directions in roughly equal amounts with respect to offset O. Thus, advantageously the effect of offset O will be partially cancelled in the sum $\theta_E=(\theta_1+\theta_2)/2$. In some advanced TOF systems, the time of flight pixels can acquire more than one phase or modulation frequency at each capture. For example such multiphase-capture pixels effectively function as though they simultaneously capture $C_1^0$ and $C_1^{90}$. Such effective functionality may be implanted, for example, by rapidly time-slicing or time-multiplexing between different modulation frequencies and/or phases, or by using multiple detectors operating at different modulation frequencies and/or phases. Using such pixels, the time to assemble sequences for a dealiased frame is considerably shortened. The basic methodology described earlier herein remains the same.

Thus far, the various described dealiasing embodiments have been lossless, e.g., dealiasing was carried out with a very small TOF system performance penalty. A lossy so-called least common multiple (LCM) dealiasing embodiment will now be described reference to FIGS. 5A and 5B. In FIGS. 5A and 5B, two distance measurements are made using two modulation frequencies $f_1$ and $f_2$, for which frequencies $Z_{AIR1}$ and $Z_{AIR2}$ represent the associated maximum unambiguous aliasing interval ranges. In FIG. 5A, $f_1$ is 25 MHz, and $Z_{AIR1}$ is 3 M, while in FIG. 5B, $f_2$ is a lower 18.75 MHz, and $Z_{AIR2}$ is a longer 4 M. Assume a target object is present 7 m from the TOF sensor array. If a single modulation frequency $f_1$=of 25 MHz is used to acquire data, one can infer that the Z distance of the object is either 1 m, 4 m, 7 m, or 12 m as suggested by the cross-hatched rectangular regions in FIG. 5A. On the other hand, if a single modulation frequency $f_2$=18.75 MHz is used, one can infer the target object is at 3 m, 7 m, or 11 m, as suggested by the cross-hatched rectangular regions in FIG. 5B.

According to the LCM embodiment, the above-two results are combined, leading to the conclusion that the target object must be at a distance of 7 m. The target object is drawn in FIGS. 5A and 5B with heavy bold lines to distinguish from phantom locations, which are drawn in phantom. The true location of the target object could still be confused with another location at 19 M, but compared to the one-modulation frequency case, the use of two modulation frequencies has extended the unambiguous interval range substantially. According to the Ser. No. 12/459,033 application, if two modulation frequencies are used, the effective unambiguous interval range is increased according to the LCM least common multiple of $Z_{AIR1}$ and $Z_{AIR2}$. One strategy in selecting modulation frequencies is to maximize the LCM of the corresponding unambiguous interval ranges by choosing two frequencies close to each other.

Another embodiment of the Ser. No. 12/459,033 application provides a lossy so-called branch and bound hierarchical approach to dealiasing. According to this embodiment, a relatively very low modulation frequency may be used to determine whether a target object is within a first or a second Z range or bin, e.g., perhaps between a 0 m to 50 m range, or perhaps between a 50 m to 100 m range. If TOF system 200 determines that the target object is within say 0 m to 50 m, then software 200 can cause clock 180' to double the modulation frequency to determine whether the target object lies within a 0 m to 25 m sub-range (or narrower bin), or within a 25 m to 50 m sub-range (or narrow bin). A similar analysis and modulation frequency change is performed should the object initially have been found to lie with a 50 m to 100 m range. This method of estimating distance range for the target object and then changing modulation frequency to better ascertain the distance range is repeated preferably until the range is determined with a desired range granularity. Again this method is preferably carried out automatically under command of software 220. Of course while this example assumed the various alternate ranges or bins were 2× apart, other ratios may be used.

During a branch and bound hierarchical dealiasing process it is not necessary to obtain full certainty (e.g., best granularity) at each modulation frequency. For lower modulation frequencies it can suffice to obtain lower resolution. For example, to decide between the 0 m to 50 m, and 50 m to 100 m ranges or bins, a fairly coarse level of resolution is sufficient. For example, if a highest quality depth image acquired by system 200 uses say ten bits, a fairly coarse level of resolution may only require three to four bits of resolution. Advantageously therefore captures at low modulation frequency may have short shutter times to reflect these relaxed requirements. In general for a hierarchical sweep of modulation frequencies, e.g., 1 MHz, 10 MHz, 100 MHz, the shutter will be short for all but the highest swept frequency, here 100 MHz. So doing advantageously reduces the amount of integration time the sensor array is operated at low modulation frequencies, which further boosts effective performance.

Understandably, using branch and bound hierarchical dealiasing, it may be desirable to minimize the number of bins for each relatively low modulation frequency. In turn, the hierarchical modulation frequency sweep process tends to maximize the effective system TOF modulation frequency by keeping the resolution requirement at each lower modulation frequency as small as feasible. If desired, a branch and bound embodiment may be combined with lossless dealiasing embodiment at one or more steps in the hierarchical process.

The above description was directed to lossy hierarchical type dealiasing embodiments. A lossless hierarchical dealiasing embodiment of the Ser. No. 12/459,033 application will now be described. Earlier herein it was shown that $\theta_D * f_E / f_D / 2\pi$ should be substantially less than 0.5. In an embodiment where a very long aliasing interval is desired, use of relatively high modulation frequencies $f_1$ and $f_2$ yield an $f_E/f_D$ ratio that becomes very large, making it difficult to keep $\theta_D * f_E / f_D / 2\pi \ll 0.5$. For such applications, a lossless dealiasing method may also be applied hierarchically. In this fashion, at each step in the hierarchical process, as governed by noise consideration and as controlled by software 220, the ratio $f_E/f_D$ is kept relatively small.

Consider the following example, in which modulation frequencies $f_a$=100 MHz, $f_b$=110 MHz, $f_c$=111 MHz are used, and wherein there are defined difference frequencies $D_1$=$f_b$−$f_a$=10 MHz, $D_2$=$f_c$−$f_a$=11 MHz., and hierarchically applied difference frequency $E_1$=$D_2$−$D_1$=1 MHz.

In a so-called top-down sweep, initially frequency $E_1$ is used to dealias acquired phase data for $D_1$ and for $D_2$. In this initial step, $f_1$=$D_1$, $f_2$=$D_2$ and $f_D$=$E_1$. The ratio $f_E/f_D$ advantageously is not too large, here approximately 10. Thus, in this example, dealiased Z values may be found for an effective frequency $\theta_E$=$(\theta_1+\theta_2)/2$.

Going down one step in the hierarchical process, the above found and dealiased value of $\theta_E$ will now be used in the current step as dealiasing phase $\theta_D$ for effective frequency $0.33(f_a+f_b+f_c)$ and effective phase $\theta_E$=$0.33(\theta_a+\theta_b+\theta_c)$. Advantageously, it is noted that the ratio $f_E/f_D$ remains relatively small, here approximately 10. In this fashion, as the bottom of the hierarchy, $\theta_E$ is 0.33(100 MHz+110+111 MHz), i.e., close to 100 MHz, yet is has been dealiased as though its frequency were $E_1$=1 MHz, with $Z_{AIR}$ of about 150 M.

In addition, it is noted that TOF system 200 is not necessarily physically acquiring phase data with a modulation frequency $f_c$=111 MHz. Frequency $f_c$ may be computed mathematically, for example as $f_c$=(110 MHz+100 MHz/100), e.g., $f_b$+$(f_a)/100$. Thus only frequencies $f_a$ and $f_b$ need to be physically measured by the TOF system.

In summary, dealiasing according to embodiments of the Ser. No. 12/459,033 application is lossless, and provided a relatively large aliasing interval range commensurate with a low modulation frequency. These embodiments also provide high precision certainty with respect to a given Z value, commensurate with a modulation frequency close to the highest modulation frequency $f_m$. Dealiasing could be carried out relatively losslessly or with loss, depending upon the embodiment.

Figure 6:
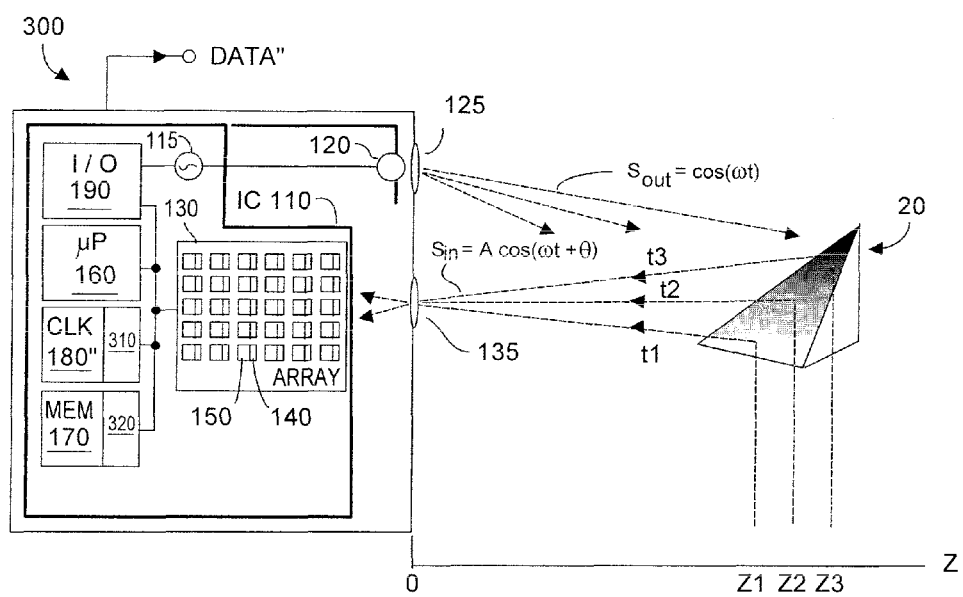
FIG. 6 depicts a phase-type time-of-flight three-dimensional imaging system with hierarchical dealiasing, according to embodiments of the present invention.

Turning now to FIG. 6, a phase-based TOF system 300 implements the present invention. TOF system 300 includes a clock unit 180" that may be modified over clock unit 180 in FIG. 1A and, or alternatively, includes hardware 310 and/or software 320. Software 320 may but need not be executed by processor 160. This hardware and/or software implement the various embodiments of the present invention, which will now be described.

Recall the following relationships from equation (2) and equation (8) presented earlier herein that show unambiguous range Z is inversely proportional to modulation frequency f:

$$Z = \frac{c}{2f} \times \frac{\theta}{2\pi} = \frac{\theta C}{4\pi f} \text{ and } Z = \frac{C}{4\pi} \frac{\Delta\theta}{\Delta f}$$

where $\Delta f = f_D = f_1 - f_2$, phase $\Delta\theta = \theta_D = \theta_1 - \theta_2$. The undesirable sensitivity to noise of two frequency dealiasing is seen in FIG. 3, where the relationship between $\theta_{DS}$ and $\theta_D$ is given by:

$$\theta_{DS} = \frac{f_E}{f_D} \theta_D.$$

where $$f_E = \frac{f_1 + f_2}{2},$$

$\theta_D = \theta_1 - \theta_2$ is phase associated with $f_D$, $$\theta_E = \frac{\theta_1 + \theta_2}{2}$$

is phase associated with $f_E$. Phase $\theta_D$ was scaled to yield $\theta_{DS}$, whose frequency slope is given by the above equation. Note that $\theta_{DS} \cong \theta_E + 2n\pi$.

Unfortunately in the presence of noise, the difficulty of de-aliasing increases as the ratio $$\frac{f_E}{f_D}$$

increases. This is because noise present in $\theta_E$ will be amplified by this ratio when $\theta_E$ is used to compute $\theta_{DS}$. Therefore, for high modulation frequency (corresponding to large effective frequency $f_E$) or very large unambiguous range (corresponding to small difference frequency $f_D$), such amplified noise would produce erroneous results in estimating de-aliasing interval K and would cause aliasing in the middle of the unambiguous range. This is apparent from FIG. 3 if one imagines the angle (or slope) of $\theta_{DS}$ increased or decreased, as the ratio $$\frac{f_E}{f_D}$$

increases or decreases, as $\theta_{DS} \cong \theta_E + 2n\pi$.

Thus an increased ratio $$\frac{f_E}{f_D}$$

represent amplified noise in $\theta_D$ and is undesired because it contributes to a wrong dealiasing decision. What is desired is to simultaneously maintain a small ratio $$\frac{f_E}{f_D},$$

while achieving a dealiasing range associated with small $f_D$, and a precision of depth associated with a large $f_E$. This is accomplishing using preferably at least three modulation frequencies, as will now be shown. Embodiments of the present invention preferably employ an n-step hierarchical dealiasing approach to avoid aliasing problems caused by very large amplification of the noise in $\theta_E$.

Assume there are m modulation frequencies $f_1, f_2, \ldots, f_m$ ($f_1 > f_2 >, \ldots, > f_m$), and it is desired that TOF system 300 achieve unambiguous range $Z_D$, which corresponds the frequency $f_D$ as in $$Z_D = \frac{\phi c}{4\pi f_D}. \ Z_D = \frac{\phi c}{4\pi f_D}.$$

One embodiment uses $f_D$ to de-alias and achieve the distance resolution of the effective frequency $f_E$, where $f_E = g_0(f_1, f_2, \ldots, f_m)$ is a function of the modulation frequencies $f_1, f_2, \ldots$, preferably an arithmetic mean or a weighted average.

Instead of using $f_D$ to dealias the phase for effective frequency $f_E$ in one step dealiasing, embodiments of the present invention preferably generate a set of N−1 intermediate frequencies $f_{DE1}, f_{DE2}, \ldots, f_{DE(N-1)}$, where $f_D < f_{DE1} < f_{DE2} < \ldots < f_{DE(N-1)} < f_E$ $f_D < f_{DE1} < f_{DE2} < \ldots < f_{DE(N-1)} < f_E$. Each of the intermediate frequencies is a function of the modulation frequencies $f_1, f_2, \ldots, f_m$ as in $f_{DEk} = g_k(f_1, f_2, \ldots, f_m)$ where $k = 1, 2, 3 \ldots, N-1$.

$f_{DEk} = g_k(f_1, f_2, \ldots, f_m)$ where $k = 1, 2, 3 \ldots, N-1$, and let $f_{DE0} = f_D$, and $f_{DEN} = f_E$.

At each step of the hierarchical de-aliasing, a preferred method de-aliases the phase $\theta_{DEk}$ of $f_{DEk}$ using the phase $\theta_{DE(k+1)}$ of $f_{DE(k+1)}$ (k=0, 1, ... N−1) by finding the correct de-aliasing interval $m_k$ such that $\theta_{DEk\_scaled} \cong \theta_{DE(k+1)} + m_k 2\pi$, $w\theta_{DEk\_scaled} \cong \theta_{DE(k+1)} + m_k 2\pi$ here $$\theta_{DEK\_scaled} = \frac{f_{DE(k+1)}}{f_{DEk}} \theta_{DEk}.$$

The final unwrapped phase for $f_E$ will be given as:

$$\theta_E + m_{N-1} 2\pi + m_{N-2} \frac{f_{DE(N-1)}}{f_{DE(N-2)}} 2\pi + \ldots + m_k \frac{f_{DE(k+1)}}{f_{DEk}} 2\pi + \ldots + m_1 \frac{f_{DE1}}{f_D} 2\pi$$

The number of the intermediate frequencies N−1 and the ratio $$\frac{f_{DE(k+1)}}{f_{DEk}}$$

between frequencies in each consecutive pair preferably are determined by the uncertainty of the depth. As a rule of thumb, preferably the uncertainty of the amplifying factor at each step is sufficiently small such that the probability of choosing $m_k$ incorrectly is low.

Embodiments implementing two-step (three-frequency) hierarchical dealiasing will now be described with reference to FIG. 6 and FIGS. 7A-7D. For two-step hierarchical dealiasing, at least N=3 modulation frequencies are needed. The total unambiguous range of the system is determined by $f_D$, which is a function of the three modulation frequencies.

As shown in FIG. 3, below, first phase $\theta_D$ is used for $f_D$ to de-alias the phase $\theta_{DE}$ of some intermediate frequency $f_{DE}$, and the correct de-aliasing interval m for $\theta_{DE}$ such that, $\theta_{DS} \cong \theta_{DE} + m2\pi$.

In the second step of hierarchical de-aliasing, each de-aliasing interval of $\theta_{DE}$ is used to de-alias the effective phase $\theta_E$ of the effective frequency $f_E$ by finding the correct de-aliasing interval n such that $\theta_{DS} \cong \theta_E + n2\pi$.

Considers now FIGS. 7A-7D. Combining the two de-aliasing steps enables determination of the final de-aliased values for $\theta_E$ as $$\theta_E + n2\pi + m\frac{f_{DE}}{f_D}2\pi.$$

Note that the amplification ratio for the de-aliasing steps are $$\frac{f_{DE}}{f_D} \text{ and } \frac{f_E}{f_{DE}}$$

respectively. Advantageously, this method achieves the desired large ratio $$\frac{f_E}{f_{DE}} = \frac{f_{DE}}{f_D} \times \frac{f_E}{f_{DE}}$$

without amplifying the noise in $\theta_E$ by such a large ratio. The beneficial result occurs because the de-aliasing intervals m and n are determined separately and the noise is amplified at much smaller ratio at each method step.

Exemplary algorithm details for two-step hierarchical dealiasing will now be described with reference to FIGS. 7A-7D. It is understood that these steps are preferably carried out with TOF system 300, e.g., by clock unit 180", and/or modules 310, 320. Embodiments of the present invention preferably use at least three modulation frequencies. Given three modulation frequency $f_1$, $f_2$ and $f_3$, it is desired to achieve an effective frequency $f_E$ that is as close as possible to the TOF system maximum modulation frequency $f_m$. Let $f_D = f_1 - f_2$ be designated as the slowest frequency associated with the total dealiasing range, and let $f_{DE} = f_1 - f_3$ be designated as the intermediate frequency. The final effective frequency can be $$f_E = \frac{f_1 + f_2 + f_3}{3}$$

or other weighted linear combination of $f_1$, $f_2$ and $f_3$.

Figure 7A:
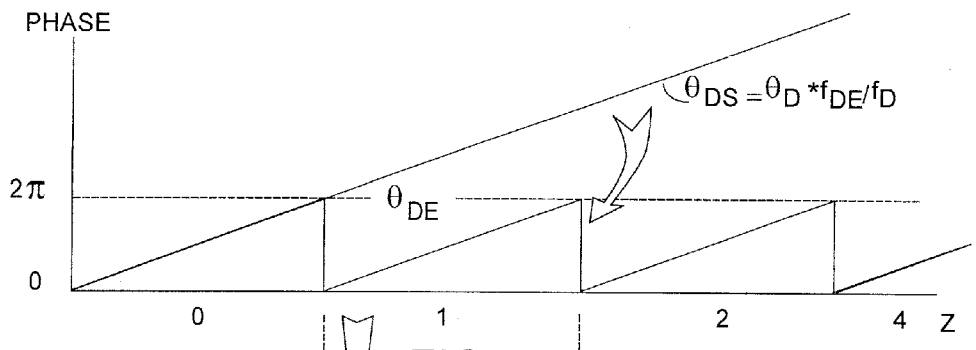
FIG. 7A-7D depict phase-vs-distance Z for various steps in hierarchical dealiasing, according to embodiments of the present invention.
Figure 7B:
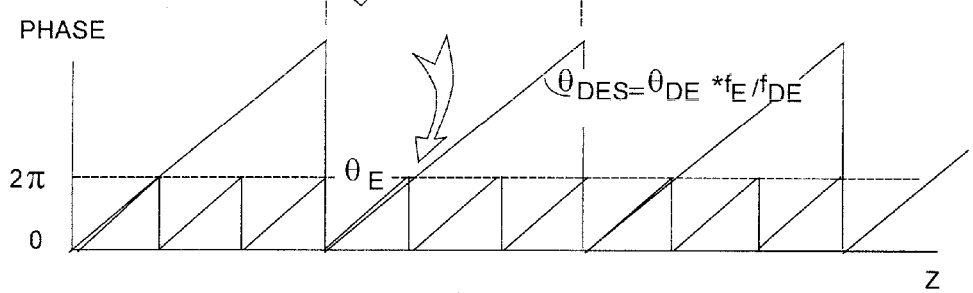
Figure 7C:
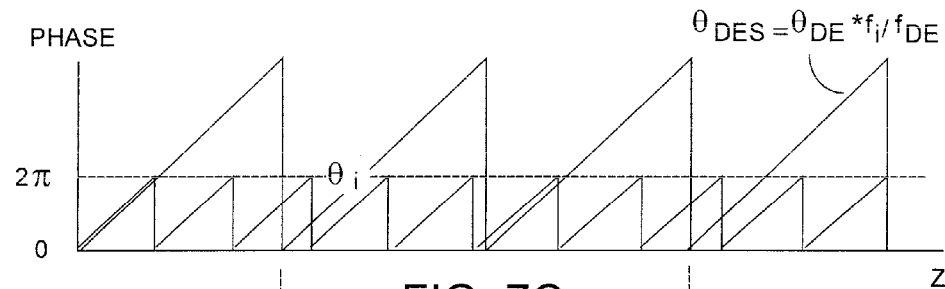

As shown in FIG. 7A, one can first use phase $\theta_D$ for frequency $f_D$ to dealias the phase $\theta_{DE}$ of some intermediate frequency $f_{DE}$ and the correct dealiasing interval m for phase $\theta_{DE}$ such that $\theta_{DS} \cong \theta_E + m2\pi$. As shown in FIG. 7B one can now use each dealiasing interval of $\theta_{DE}$ to dealias the effective phase $\theta_E$ of the effective frequency $f_E$ by finding the correct dealiasing interval n, such that $\theta_{DES} \cong \theta_E + n2\pi$. FIGS. 7C and 7D depict how to dealias phase $\theta_i$ of individual frequency $f_i$ (i=1, 2, or 3, for three frequenices), using phase $\theta_{DES}$. For example, FIG. 7C shows that $\theta_{DE}$ and $\theta_i$ are likely to wrap around at different distances. Thus one cannot dealias phase more than the first cycle of $\theta_{DE}$. (To dealias $\theta_{DS}$ as shown in FIG. 7A, one would have to dealias $\theta_{DE}$ for all of the four cycles shown in the figure.) FIG. 7D shows that one can compute the offset-corrected phase $\theta_i^{offset}$, which will always start at zero phase at the beginning of each cycle of $\theta_{DES}$. One can then use this offset-compensated phase to dealias phase $\theta_i$ over the multiple cycles of $\theta_{DES}$.

Thus, a first method step is to dealias $f_{DE} = f_1 - f_3$ using $f_D = f_1 - f_2$. Let $\theta_1$ be the phase of $f_1$, let $\theta_2$ be the phase of $f_2$, and let $\theta_3$ to be the phase of $f_3$. First it is necessary to unwrap $\theta_1$ using $\theta_2$ to get $\theta_1^{unwrap-2}$. $\theta_1^{unwrap-2} = \theta_1 + 2\pi*(\theta_1 < \theta_2)$, and unwrap $\theta_1$ using $\theta_3$ to get $\theta_1^{unwrap-3}$. One can then obtain phase for $f_D = f_1 - f_2$ as $\theta_D = \theta_1^{unwrap-2} - \theta_2$ and one can obtain phase for $f_{DE} = f_1 - f_3$ as $\theta_{DE} = \theta_1^{unwrap-3} - \theta_3$.

One can now rescale $\theta_D$ to the same slope as $\theta_{DE}$ and create $\theta_{DS}$, where $$\theta_{DS} = \frac{f_{DE}}{f_E}$$

$$\theta_D = \frac{f_1 - f_3}{f_1 - f_2}\theta_D.$$

Completing the first step, one can next find the correct dealiasing interval m by minimizing $|\theta_{DS} - (\theta_{DE} + m2\pi)|$ for m=0, 1, 2, . . . .

Consider now step two of the method, which involves dealiasing $$f_E = \frac{f_1 + f_2 + f_3}{3}$$

from $f_{DE} = f_1 - f_3$. Although it is desired to dealias $f_E$, this cannot be done direction because one cannot get the phase corresponding to $$f_E = \frac{f_1 + f_2 + f_3}{3}$$

with the correct warpping-aroung method. Instead embodiments of the present invention dealias $f_1$, $f_2$ and $f_3$ separately and get the unwrapped phases $\phi_1 = \theta_1 + n_1 2\pi, \phi_2 = \theta_2 + n_2 2\pi$, and $\phi_3 = \theta_3 + n_3 2\pi$.

The unwrapped phase for $$f_E = \frac{f_1 + f_2 + f_3}{3}$$

can be calculated as $$\phi_E = \frac{\phi_1 + \phi_2 + \phi_3}{3}.$$

Dealiasing $f_i$ (i=1, 2, 3) to get the unwrapped phase $\phi_i$ will now be described with reference to FIG. 7C and FIG. 7D. As shown in FIG. 7C, $\theta_{DE}$ and $\theta_i$ are likely to wrap around at different Z distance because of the frequency differences. This will cause problems in the second step of dealiasing unless additional constraints on the frequencies are imposed, e.g., $\theta_i$ is an multiplier of $\theta_{DE}$. Otherwise, if one directly applied the dealiasing method as the first step to dealias $\theta_i$ using $\theta_{DE}$, one could only dealias the first cycle of $\theta_{DE}$ because in the remaining cycles, $\theta_i$ and $\theta_{DE}$ will not start at the same position and one cannot satisfy the relationship of $\theta_{DES} \cong \theta_i + n_i 2\pi$.

Figure 7D:
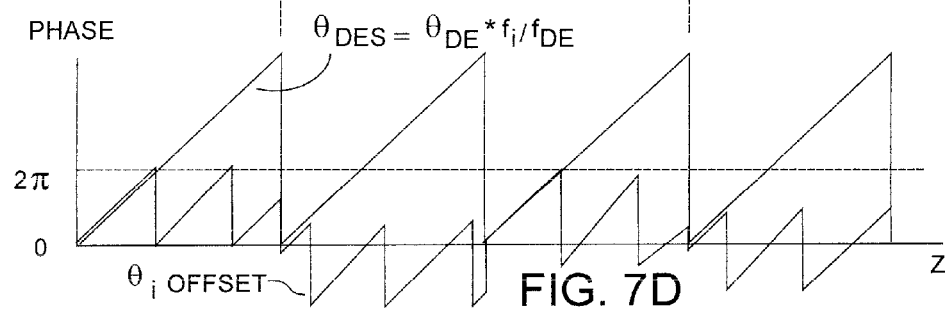

Referring to FIG. 7D, preferably an "offset compensation" method is used to avoid adding additional constraints that limit the choices of frequencies. First one can remove the offset of $\theta_i$ caused $\theta_i$ by the wrapping around of $\theta_{DES}$ and $\theta_{DES}$ and compute the offset-corrected phase $\theta_i^{offset}$. The offset-corrected phase $\theta_i^{offset}$ will always start at zero phase at the beginning of each cycle of $\theta_{DES}$. One can then find the correct de-aliasing interval by minimizing:

$|\theta_{DES}(\theta_i^{offset} + n_i 2\pi)|$ for $n_i$=0,1,2, . . . where i=1,2,3

The unwrapped phase for each frequency $f_i$ is computed as:

$$\phi_i = \theta_i^{offset} + n_i 2\pi + m \frac{f_{DE}}{f_D} 2\pi$$

The unwrapped phase for $$f_E = \frac{f_1 + f_2 + f_3}{3}$$

is then $$\phi_E = \frac{\phi_1 + \phi_2 + \phi_3}{3}.$$

It will be appreciated from the description of the preferred embodiments, that the present invention provides hierarchical dealiasing for a TOF system that functions even in the presence of noise. Preferably a number N, N≥3, of frequencies that are close to each other are used to create a slow dealiasing frequency and at least one intermediate frequency that can be used to dealias a long distance hierarchically. Advantageously, rather than amplifying noise by a very large ratio as in two-frequency dealiasing, embodiments of the present invention only amplify noise by a small ratio at each dealiasing step.

Modifications and variations may be made to the disclosed embodiments without departing from the subject and spirit of the invention as defined by the following claims.

What is claimed is:

1. A processor implemented method to hierarchically dealias distance Z range of a phase-type time of flight system having a processor, the method comprising:
   (a) acquiring data from said time of flight system using modulation frequencies $f_1, f_2, \ldots, f_m$ separately, wherein if said time of flight time of flight system were operated solely at one of said modulation frequencies, aliasing interval ranges of $Z_1, Z_2, \ldots, Z_m$ would result;
   (b) generating n intermediate frequencies $f_{DE1}, f_{DE2}, \ldots, f_{DEn}$ sorted by order of $f_{DE1} < f_{DE2} < \ldots < f_{DEn}$ and computing their corresponding phases from data acquired at step (a); and
   (c) hierarchically dealiasing data acquired at step (a) using said intermediate frequencies generated at step (b);
   wherein said time of flight system provides an effective aliasing interval range $Z_D > Z_k$ for k=1 . . . n as if said time of flight system operated at a very low modulation frequency $f_D$, while simultaneously providing depth resolution certainty as if said time of flight system operated at a high modulation frequency $f_E$.

2. The method of claim 1, wherein at step (b), selection of said intermediate frequency $f_{DE1}, f_{DE2}, \ldots, f_{DEn}$ is based on a ratio between two frequencies $$\frac{f_{DE(k+1)}}{f_{DEk}},$$

which is limited by a ratio determined by an uncertainty requirement.

3. The method of claim 1, wherein at step (c), hierarchical dealiasing is done one step at a time.

4. The method of claim 3, wherein at step (c) includes first dealiasing phase data of $f_{DE1}$ using phase of $f_D$, and then dealiasing phase of $f_{DE2}$ using phase of $f_{DE1}$.

5. The method of claim 4, wherein at each step phase of $f_{DE(k+1)}$ is dealiased using phase of $f_{DEk}$ until a last step, at which phase $f_E$ is dealiased using phase of $f_{DEn}$ to yield unwrapped phase of $f_E$.

6. The method of claim 1, wherein $f_E$ is a function of all modulation frequencies $f_1, f_2, \ldots, f_m$, said function selected from at least one of (i) an arithmetic mean of $f_1, f_2, \ldots, f_m$, and (ii) a weighted average of $f_1, f_2, \ldots, f_m$.

7. The method of claim 1, wherein unwrapped phase of $f_E$ is computable as follows:
   (i) at a last step of hierarchical de-aliasing, dealiasing phase of each said modulation frequency $f_1, f_2, \ldots, f_m$ using $f_{DEn}$ to get unwrapped phase of each modulation frequency; and
   (ii) computing unwrapped phase of $f_E$ using a function between $f_E$ and $f_1, f_2, \ldots, f_m$.

8. The method of claim 1, wherein at each step of dealiasing phase of $f_{DE(k+1)}$ using phase of $f_{DEk}$, a corrected phase cycle of $f_{DEk}$ within the $[0, 2\pi]$ cycle of $f_{DE(k-1)}$ from a previous, de-aliasing step is used to find a correct phase cycle of $f_{DE(k+1)}$ within a cycle of $f_{DEk}$;
   wherein correct cycle of $f_{DE(k+1)}$ within a total unambiguous range $Z_D$, or the cycle of $f_D$ can be found.

9. The method of claim 1, wherein said method is carried out by said time of flight system.

10. A hierarchical dealiasing unit useable with a phase-based time of flight system, the hierarchical dealiasing unit including a memory and a processor and comprising:
    code instructing the processor to cause said time of flight system to acquire data using modulation frequencies $f_1, f_2, \ldots, f_m$ separately, wherein if said time of flight system were operated solely at one of said modulation frequencies, aliasing interval ranges of $Z_1, Z_2, \ldots, Z_m$ would result;

code instructing the processor to generate n intermediate frequencies $f_{DE1}, f_{DE2}, \ldots, f_{DEn}$ sorted by order of $f_{DE1} < f_{DE2} < \ldots < f_{DEn}$ and computing their corresponding phases from data acquired at step (a); and code instructing the processor to hierarchically dealias data acquired using said modulation frequencies $f_1, f_2, \ldots, f_m$ separately using said n intermediate frequencies $f_{DE1}, f_2, \ldots f_{DEn}$;

wherein said time of flight system provides an effective aliasing interval range $Z_D > Z_k$ for $k=1 \ldots n$ as if said time of flight system operated at a very low modulation frequency $f_D$, while simultaneously providing depth resolution certainty as if said time of flight system operated at a high modulation frequency $f_E$.

11. The hierarchical dealiasing unit of claim 10, wherein code instructing the processor to generate selects said intermediate frequency $f_{DE1}, f_{DE2}, \ldots, f_{DEn}$ based on a ratio between two frequencies $$\frac{f_{DE(k+1)}}{f_{DEk}},$$

which is limited by a ratio determined by an uncertainty requirement.

12. The hierarchical dealiasing unit of claim 10, wherein hierarchical dealiasing is done one step at a time.

13. The hierarchical dealiasing unit of claim 10, wherein there first occurs dealiasing phase data of $f_{DE1}$ using phase of $f_D$, followed by dealiasing phase of $f_{DE2}$ using phase of $f_{DE1}$.

14. The hierarchical dealiasing unit of claim 12, wherein at each step phase of $f_{DE(k+1)}$ is dealiased using phase of $f_{DEk}$ until a last step, at which phase $f_E$ is dealiased using phase of $f_{DEn}$ to yield unwrapped phase of $f_E$.

15. The hierarchical dealiasing unit of claim 10, wherein $f_E$ is a function of all modulation frequencies $f_1, f_2, \ldots, f_m$, said function selected from at least one of (i) an arithmetic mean of $f_1, f_2, \ldots, f_m$, and (ii) a weighted average of $f_1, f_2, \ldots, f_m$.

16. The hierarchical dealiasing unit of claim 10, wherein: unwrapped phase of $f_E$ is computable by, at a last step of hierarchical de-aliasing, dealiasing phase of each said modulation frequency $f_1, f_2, \ldots, f_m$ using $f_{DEn}$ to get unwrapped phase of each modulation frequency; and computing unwrapped phase of $f_E$ using a function between $f_E$ and $f_1, f_2, \ldots, f_m$.

17. The hierarchical dealiasing unit of claim 10, wherein at each step of dealiasing phase of $f_{DE(k+1)}$ using phase of $f_{DEk}$, a corrected phase cycle of $f_{DEk}$ within the $[0, 2\pi]$ cycle of $f_{DE(k-1)}$ from a previous de-aliasing step is used to find a correct phase cycle of $f_{DE(k+1)}$ within a cycle of $f_{DEk}$;

wherein correct cycle of $f_{DE(k+1)}$ within a total unambiguous range $Z_D$, or the cycle of $f_D$ can be found.

18. A phase-based time-of-flight system including a processor implementing a hierarchical dealiasing unit, said hierarchical dealiasing unit comprising:

a sensor responsive to the processor and causing said time of flight system to acquire data using modulation frequencies $f_1, f_2, \ldots, f_m$ separately, wherein if said time of flight system were operated solely at one of said modulation frequencies, aliasing interval ranges of $Z_1, Z_2, \ldots, Z_{in}$ would result;

a clock interface component for generating n intermediate frequencies $f_{DE1}, f_{DE2}, \ldots, f_{DEn}$ sorted by order of $f_{DE1} < f_{DE2} < \ldots < f_{DEn}$ and computing their corresponding phases from data acquired at step (a); and the processor hierarchically dealiasing data acquired using said modulation frequencies $f_1, f_2, \ldots, f_m$ separately using said n intermediate frequencies $f_{DE1}, f_{DE2}, \ldots, f_{DEn}$;

wherein said time of flight system provides an effective aliasing interval range $Z_D > Z_k$ for $k=1 \ldots n$ as if said time of flight system operated at a very low modulation frequency $f_D$, while simultaneously providing depth resolution certainty as if said time of flight system operated at a high modulation frequency $f_E$.

19. The time of flight system of claim 18, wherein said clock interface component selects said intermediate frequency $f_{DE1}, f_{DE2}, \ldots, f_{DEn}$ based on a ratio between two consecutive frequencies $f_{DE(k+1)}$ which is limited by a ratio determined by an uncertainty requirement.

20. The time of flight system of claim 18, wherein said hierarchical dealiasing unit has at least one characteristic selected from a group consisting of (i) hierarchical dealiasing is done one step at a time, (ii) there first occurs dealiasing phase data of $f_{DE1}$ using phase of $f_D$, followed by dealiasing phase of $f_{DE2}$ using phase of $f_{DE1}$, (iii) at each step phase of $f_{DE(k+1)}$ is dealiased using phase of $f_{DEk}$ until a last step, at which phase $f_E$ is dealiased using phase of $f_{DEn}$ to yield unwrapped phase of $f_E$, (iv) $f_E$ is a function of all modulation frequencies $f_1, f_2, \ldots, f_m$ said function selected from at least one of (i) an arithmetic mean of $f_1, f_2, \ldots, f_m$, and (ii) a weighted average of $f_1, f_2, \ldots, f_m$, (v) unwrapped phase of $f_E$ is computable by, at a last step of hierarchical de-aliasing, dealiasing phase of each said modulation frequency $f_1, f_2, \ldots, f_m$ using $f_{DEn}$ to get unwrapped phase of each modulation frequency; and computing unwrapped phase of $f_E$ using a function between $f_E$ and $f_1, f_2, \ldots, f_m$, and (vi) at each step of dealiasing phase of $f_{DE(k+1)}$ using phase of $f_{DEk}$, a corrected phase cycle of $f_{DEk}$ within the $[0, 2\pi]$ cycle of $f_{DE(-1)}$ from a previous de-aliasing step is used to find a correct phase cycle of $f_{DE(k+1)}$ within a cycle of $f_{DEk}$ such that correct cycle of $f_{DE(k+1)}$ within a total unambiguous range $Z_D$, or the cycle of $f_D$ can be found.

* * * * *